(12) United States Patent
Parvataneni et al.

(10) Patent No.: US 10,992,745 B2
(45) Date of Patent: Apr. 27, 2021

(54) METHOD AND SYSTEM FOR LIFECYCLE MANAGEMENT OF APPLICATION SERVICES AT EDGE NETWORK

(71) Applicant: Verizon Patent and Licensing Inc., Arlington, VA (US)

(72) Inventors: Raghuram Parvataneni, Edison, NJ (US); Kirk Campbell, Long Valley, NJ (US); Ravi Sharma, Freehold, NJ (US)

(73) Assignee: Verizon Patent and Licensing, Basking Ridge, NJ (US)

( * ) Notice: Subject to any disclaimer, the term of this patent is extended or adjusted under 35 U.S.C. 154(b) by 0 days.

(21) Appl. No.: 16/410,030

(22) Filed: May 13, 2019

(65) Prior Publication Data
US 2020/0366733 A1    Nov. 19, 2020

(51) Int. Cl.
| H04L 29/08 | (2006.01) |
| H04L 12/26 | (2006.01) |
| G06Q 30/06 | (2012.01) |
| H04L 12/911 | (2013.01) |
| G06Q 10/06 | (2012.01) |
| G06Q 20/32 | (2012.01) |

(52) U.S. Cl.
CPC ........ *H04L 67/1031* (2013.01); *H04L 43/067* (2013.01); *H04L 43/16* (2013.01); *H04L 67/1036* (2013.01); *H04L 67/12* (2013.01); *H04L 67/142* (2013.01); *H04L 67/16* (2013.01); *H04L 67/32* (2013.01); *H04L 67/322* (2013.01); *H04L 67/34* (2013.01); *G06Q 10/063112* (2013.01); *G06Q 20/3227* (2013.01); *G06Q 30/06* (2013.01); *H04L 47/745* (2013.01); *H04L 47/782* (2013.01)

(58) Field of Classification Search
CPC . H04L 41/5067; H04L 43/0847; H04N 21/24; H04N 21/64738
See application file for complete search history.

(56) References Cited

U.S. PATENT DOCUMENTS

| 2007/0208834 | A1* | 9/2007 | Nanamura | G06Q 30/06 709/220 |
| 2010/0131325 | A1* | 5/2010 | Song | H04L 47/745 370/235 |
| 2011/0202380 | A1* | 8/2011 | Vera | G06Q 10/063112 705/7.14 |
| 2011/0208706 | A1* | 8/2011 | Rangarajan | G06F 16/258 707/705 |
| 2012/0102224 | A1* | 4/2012 | Mercuri | H04L 67/16 709/241 |
| 2013/0086194 | A1* | 4/2013 | Estes | G06F 11/3006 709/207 |
| 2014/0250006 | A1* | 9/2014 | Makhotin | G06Q 20/3227 705/41 |

(Continued)

*Primary Examiner* — Barbara B Anyan

(57) ABSTRACT

A method, a device, and a non-transitory storage medium are described in which a lifecycle management service is provided. A network device of an application service network may use the number of requests from end devices as a basis to determine whether to terminate a virtual network device. The network device may compare the number of requests to management information that includes a threshold number of requests value. The network device may also instantiate a virtual network device based on receipt of a domain name system request and radio network information.

20 Claims, 17 Drawing Sheets

(56) References Cited

U.S. PATENT DOCUMENTS

| | | | |
|---|---|---|---|
| 2015/0288733 A1* | 10/2015 | Mao | H04L 65/602 709/219 |
| 2016/0182687 A1* | 6/2016 | Coulmeau | H04L 67/12 709/203 |
| 2016/0269240 A1* | 9/2016 | Balakrishnan | H04L 67/322 |
| 2017/0031955 A1* | 2/2017 | Kenchammana-Hosekote | H04L 67/142 |
| 2018/0069806 A1* | 3/2018 | Kumar | H04L 47/782 |
| 2018/0115392 A1* | 4/2018 | Yang | H04L 41/5025 |

* cited by examiner

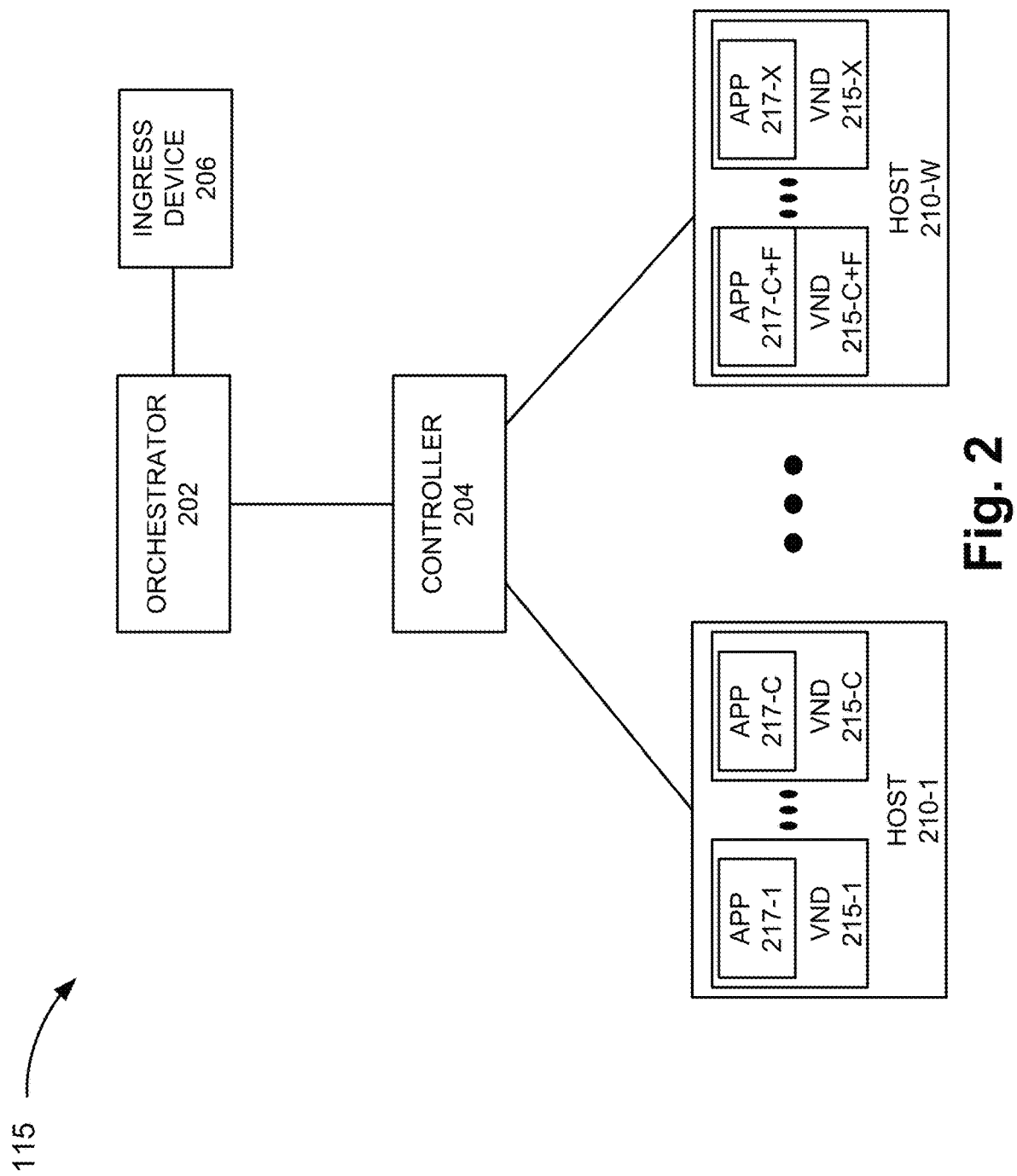

METHOD AND SYSTEM FOR LIFECYCLE MANAGEMENT OF APPLICATION SERVICES AT EDGE NETWORK

BACKGROUND

Development and design of networks present certain challenges from a network-side perspective and an end device perspective. In order to enhance performance, multi-access edge computing (MEC) (also known as mobile edge computing (MEC)) is being explored in which core network capabilities (e.g., computational, storage, communication links, etc.) are situated at the network edge in order to reduce traffic being sent to the core network and reduce latency.

BRIEF DESCRIPTION OF THE DRAWINGS

FIG. 2 is a diagram illustrating an exemplary MEC network that may be used in support of the lifecycle management service;

DETAILED DESCRIPTION OF PREFERRED EMBODIMENTS

Figure 1:
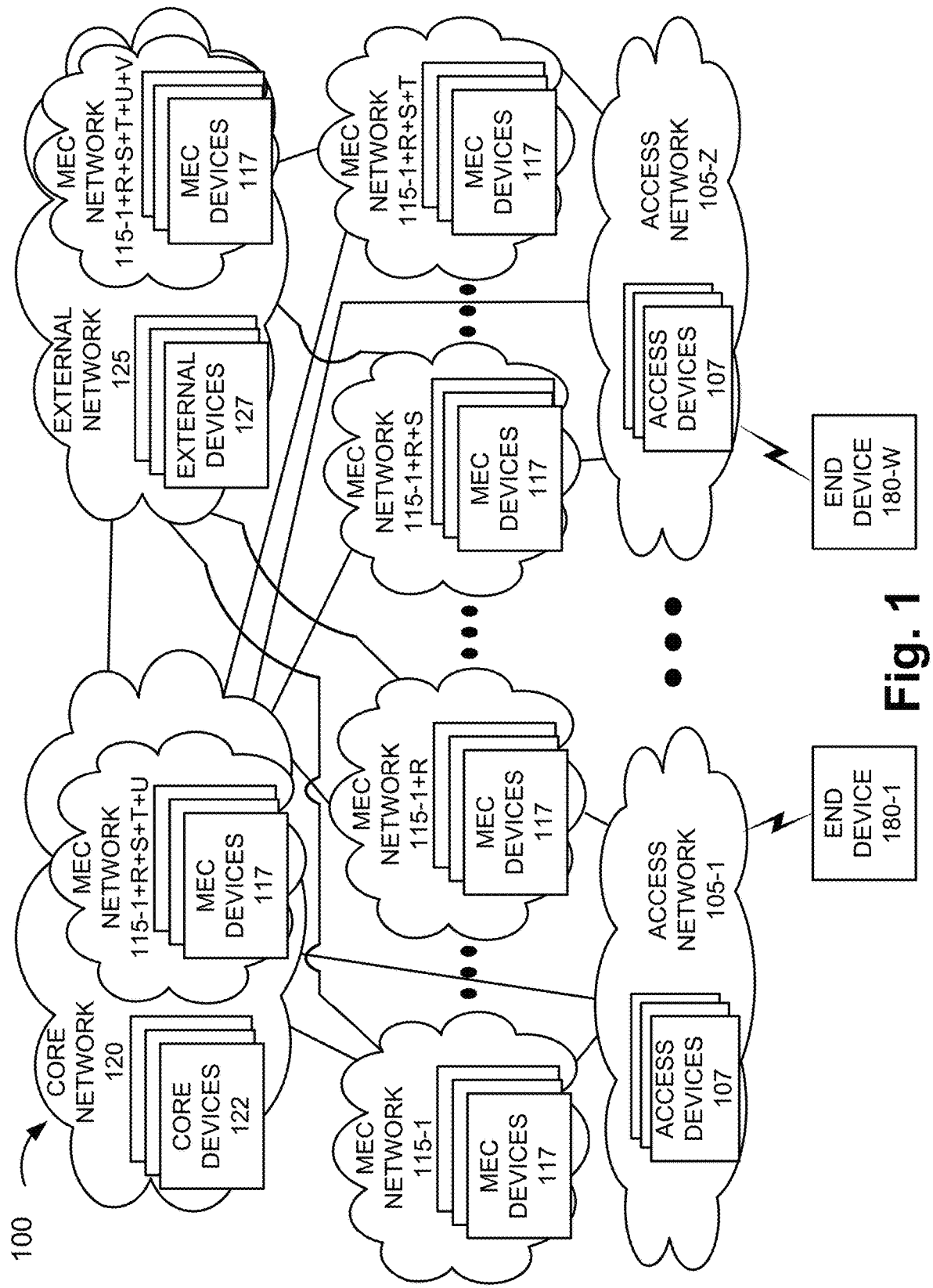
FIG. 1 is a diagram illustrating an exemplary environment in which an exemplary embodiment of a lifecycle management service may be implemented.

The following detailed description refers to the accompanying drawings. The same reference numbers in different drawings may identify the same or similar elements. Also, the following detailed description does not limit the invention.

MEC networks or other types of end device application or service layer networks (referred to as "application service layer network") may not always have sufficient available resources to accommodate all end devices at all times. For example, the MEC network may have insufficient resources (e.g., physical, logical, virtual) due to the number of end devices/users being served, the number of applications running simultaneously, the amount of content data involved in relation to the applications (e.g., 3D extreme reality, etc.), the state of the MEC network (e.g., in the process of being deployed, reconfigured, upgraded; failures, congestion, etc.), and/or the state of neighboring MEC networks (e.g., failures, congestion, etc.). As a result, the MEC network or other types of application service layer networks may be unable to support a level of quality of service associated with an application and/or a service (referred to as an "application service"). For example, the delivery of an application service to an end device may suffer from degradation of various performance metrics, such as latency, error rate, throughput, packet loss, etc. Additionally, some users of an application service may be denied service, and other users may experience intermittent application service.

MEC networks and other types of application service layer networks may use a virtualization technology for provisioning of an application service. For example, the virtualization of a network device may be implemented based on a virtual container or a virtual machine (VM) (referred to as a "virtual network device") along with other virtualization technology/architecture, such as a hypervisor, a container engine, and underlying hardware resources of the network device (e.g., a host device). The virtualization technology and/or architecture support the creation, deletion, and intermediary operational state (also known as the "lifecycle") of the virtual network device and instance of the application service. The network device may include one or multiple instances of the virtual network device (and associated one or multiple instances of the application service, which may be the same or different application services) and the configuration may differ depending on the virtualization technology/architecture implemented.

Typically, however, the MEC network is configured to maintain a minimum number of virtual network devices and/or application instances in support of any given application service. For example, the MEC network may be configured to sustain and keep active a virtual network device and an application service even when there is no end device demand for the application service. This can lead to unnecessary use of network resources of the network device and MEC network, which are costly, particularly when end device demand for the application service does not warrant such a configuration. Additionally, the instantiation and termination of virtual network devices are managed manually by a network administrator or other network personnel. The manual procedures involved typically are executed slowly and lend themselves to erroneous entry.

According to exemplary embodiments, a lifecycle management service is described. According to an exemplary embodiment, the lifecycle management service may be implemented by a MEC network. According to other exemplary embodiments, the lifecycle management service may be implemented by another type of application service layer network. For example, the application service layer network may include the Internet, the World Wide Web (WWW), an Internet Protocol Multimedia Subsystem (IMS) network, a Rich Communication Service (RCS) network, a cloud network, a packet-switched network, a data center, a private network, a fog network, or another type of network that hosts an end device application service on a virtual network device, as described herein.

According to an exemplary embodiment, the lifecycle management service manages the lifecycle of a virtual network device and associated application service. For example, the lifecycle includes the instantiation or start-up of the virtual network device and associated application service, an operational state subsequent to instantiation but before termination of the virtual network device and associated application service (e.g., active, under maintenance, refreshing, paused, suspended, rebooting, or another type of state or status), and the termination of the virtual network device and associated application service.

According to an exemplary embodiment, the lifecycle management service obtains and uses lifecycle management information to determine and manage the operational state of the virtual network device. According to an exemplary embodiment, the lifecycle management information includes usage data pertaining to the application service. For example, the usage data may indicate the number of requests (e.g., by end devices/users) for the application service. According to an exemplary embodiment, the lifecycle management service may delete or terminate a virtual network device when the number of requests does not satisfy a threshold usage value.

According to an exemplary embodiment, the lifecycle management information includes other types of data. For example, the lifecycle management information may include data pertaining to network resource usage (e.g., physical, virtual, and/or logical resources), security, health, load balancing, quality of service (QoS) (e.g., Key Performance Indicator (KPI), throughput, latency, packet loss, etc.) of the virtual network device, and/or other types of data pertaining to the management of a virtual network device, a component of the virtual network device (e.g., an application/software, an operating system of a VM, etc.), a network device, an application service layer network, a policy, a rule, or other network element that supports the provisioning of the application service, as described herein. According to an exemplary embodiment, the lifecycle management service may use one or more instances of these other types of lifecycle management information to determine and manage the operational state of the virtual network device, a network device, and an application service layer network, as described herein.

According to an exemplary embodiment, the lifecycle management service may automatically instantiate or startup a virtual network device based on the receipt of a domain name service (DNS) request.

In view of the foregoing, the lifecycle management service may prevent or minimize unnecessary use of costly network resources in a MEC network or another type of application service layer network, while still satisfying end device demands for the application service. Additionally, in contrast to existing approaches, the lifecycle management service may manage the instantiation and termination of an application service automatically versus manually (e.g., by a network administrator or other personnel).

FIG. 1 is a diagram illustrating an exemplary environment 100 in which an exemplary embodiment of the lifecycle management service may be implemented. As illustrated, environment 100 includes access networks 105-1 through 105-Z (referred to collectively as access networks 105, and individually or generally as access network 105), MEC network 115-1 through 115-1+R+S+T+U+V (referred collectively as MEC networks 115, and individually or generally as MEC network 115), a core network 120, and an external network 125. Access network 105 includes access devices 107. MEC network 115 includes MEC devices 117. Core network 120 includes core devices 122. External network 125 includes external devices 127. Environment 100 further includes end devices 180-1 through 180-W (referred to collectively as end devices 180, and individually or generally as end device 180).

The number, the type, and the arrangement of network devices, and the number of end devices 180 are exemplary. A network device, a network element, or a network function (referred to herein simply as a network device) may be implemented according to one or multiple network architectures, such as a client device, a server device, a peer device, a proxy device, a cloud device, a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architecture (e.g., Software Defined Networking (SDN), virtual, logical, network slice, etc.).

According to other exemplary embodiments, environment 100 may include additional networks, fewer networks, and/or different networks than those illustrated and described herein. For example, environment 100 may not include external network 125. Additionally, or alternatively, environment 100 may include a fog network, a backhaul network, a fronthaul network, and/or another type of network not specifically mentioned herein. Additionally, or alternatively, although MEC network 115 is described as providing the lifecycle management service, according to other exemplary embodiments, other types of application service layer networks (e.g., the Internet, an IMS network, a public network, a fog network, an RCS network, etc.) may be implemented to include the lifecycle management service, as described herein.

Environment 100 includes communication links between the networks, between the network devices, and between end devices 180 and the network/network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the lifecycle management service may use at least one of these planes of communication. Additionally, an interface of a network device may be modified (e.g., relative to an interface defined by a standards body, such as Third Generation Partnership Project (3GPP), International Telecommunication Union (ITU), European Telecommunications Standards Institute (ETSI), etc.) in order to support the communication (e.g., transmission and reception of messages, information elements (IE), attribute value pairs (AVPs), etc.) between network devices and the lifecycle management service, as described herein. According to various exemplary implementations, the interface may be a service-based interface or a reference point-based interface.

Access network 105 may include one or multiple networks of one or multiple types and technologies. For example, access network 105 may be implemented to include a Fourth Generation (4G) radio access network (RAN) (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, a next generation RAN (e.g., a Fifth Generation (5G)-access network (5G-AN) or a 5G-RAN (referred to herein as simply a 5G-RAN)), and/or another type of future generation RAN. Access network 105 may include other types of RANs (e.g., a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, and/or an Evolution Data Optimized (EV-DO) RAN).

Access network 105 may communicate with other types of access networks, such as, for example, a WiFi network, a Worldwide Interoperability for Microwave Access (WiMAX) network, a local area network (LAN), a Citizens Broadband Radio System (CBRS) network, a cloud RAN, a wired network (e.g., optical, cable, coaxial, copper, etc.), or another type of network that provides access to or can be used as an on-ramp to access network 105, MEC network 115, and/or core network 120.

Access network 105 may include different and multiple functional splitting, such as options 1, 2, 3, 4, 5, 6, 7, or 8 that relate to the splitting of the physical layer, Media Access Control (MAC), Radio Link Control (RLC), and Packet Data Convergence Control (PDCP), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

According to various exemplary embodiments, access network 105 may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, access network 105 may be implemented according to various wireless technologies (e.g., radio access technology (RAT), etc.), wireless standards, wireless frequencies/bands, and different segments of radio spectrum (e.g., centimeter (cm) wave, millimeter (mm) wave, below 6 Gigahertz (GHz), above 6 GHz, licensed radio spectrum, unlicensed radio spectrum, carrier frequency, etc.).

Depending on the implementation, access network 105 may include one or multiple types of network devices that are illustrated in FIG. 1 as access devices 107. For example, access devices 107 may be implemented to include an evolved Node B (eNB), an eLTE eNB, a next generation Node B (gNB), a base station (BS), a base transceiver station (BTS), a Node B, a remote radio head (RRH), an RRH and a baseband unit (BBU), a BBU, a radio network controller (RNC), a small cell node (e.g., a picocell device, a femtocell device, a microcell device, a home eNB, a repeater, etc.), or another type of network device that provides a wireless access service.

MEC network 115 includes a platform that provides an application service. As illustrated, MEC network 115 may be located at an edge of a network, such as access network 105, or co-located with various types of network, such as core network 120 or external network 125. Alternatively, MEC network 115 may not be co-located. MEC network 115 may be implemented using one or multiple technologies including, for example, network function virtualization (NFV), containers, SDN, cloud computing, Infrastructure-as-a-Service (IaaS), Platform-as-a-Service (PaaS), Software-as-a-Service (SaaS), or another type of network technology.

Depending on the implementation, MEC network 115 may include various types of network devices that are illustrated in FIG. 1 as MEC devices 117. For example, MEC devices 117 may include virtual network devices (e.g., virtualized network functions (VNFs), servers, hosts, containers, hypervisors, virtual machines, network function virtualization infrastructure (NFVI), and/or other types of virtualization elements, layers, hardware resources, operating systems, engines, etc.) and associated applications services for use by end devices 180. The application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, and/or other types of mobile edge application services.

Additionally, depending on the implementation, MEC devices 117 may include other types of network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, and/or other types of network devices (e.g., routers, core devices 122, an ingress device, a load balancer, etc.), and network resources (e.g., storage devices, communication links, etc.).

According to an exemplary embodiment, MEC devices 117 of MEC network 115 include logic that provides a lifecycle management service, as described herein. For example, the lifecycle management service obtains and uses lifecycle management information to determine and manage the operational state of the virtual network device and associated application service. According to an exemplary embodiment, the lifecycle management information includes usage data of the application service that may indicate the number of requests (e.g., by end devices/users) for the application service. According to an exemplary embodiment, the lifecycle management service may create or delete one or multiple virtual network devices depending on the usage data and comparison with a threshold usage value.

According to another exemplary embodiment, the lifecycle management service may use other types of life cycle management data pertaining to network resource usage, security, health, load balancing, QoS, and/or other types of data pertaining to the management of one or multiple virtual network devices, MEC device 117, MEC network 115, a policy, a rule, or other network element that supports the provisioning of the application service, as described herein.

Core network 120 may include one or multiple networks of one or multiple network types and technologies. Core network 120 may include a complementary network of access network 105. For example, core network 120 may be implemented to include an Evolved Packet Core (EPC) of an LTE, an LTE-A, an LTE-A Pro, a next generation core (NGC) network, a legacy core network, and/or a future generation core network.

Depending on the implementation of core network 120, core network 120 may include various types of network devices that are illustrated in FIG. 1 as core devices 122. For example, core devices 122 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 120 may include additional, different, and/or fewer network devices than those described.

External network 125 may include one or multiple networks of one or multiple network types and technologies. For example, external network 125 may be implemented to include a service or an application-layer network, the Internet, the WWW, an IMS network, an RCS network, a cloud network, a packet-switched network, a data center, a private network, or other type of network that hosts an end device application service.

Depending on the implementation of external network 125, external network 125 may include various network devices depicted in FIG. 1 as network devices 127. For example, network devices 127 may provide various applications, services, or another type of end device asset, such as a server (e.g., web, application, cloud, etc.), mass storage device, data center devices, routers, and/or other types of network devices pertaining to various network-related functions.

End device 180 includes a device that has computational and wireless communication capabilities. End device 180 may be implemented as a mobile device, a portable device, a stationary device (e.g., a non-mobile device), a device operated by a user, or a device not operated by a user. For example, end device 180 may be implemented as a mobile broadband device, a smartphone, a computer, a tablet, a netbook, a phablet, a wearable device, a vehicle support system, a drone, or some other type of mobile wireless device. According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, DC service, and so forth. Additionally, end device 180 may include one or multiple communication interfaces that provide one or multiple (e.g., simultaneous or non-simultaneous) connections via the same or different RATs, frequency bands, access devices 107, and so forth.

FIG. 2 is a diagram illustrating an exemplary embodiment of MEC devices 117 of a MEC network 115 that provides the lifecycle management service. As illustrated, MEC network 115 may include an orchestrator 202, a controller 204, an ingress device 206, and hosts 210-1 through 210-W (also referred to as hosts 210, and individually or generally as host 210). Hosts 210 may include virtual network devices 215-1 through 215-X (also referred to as virtual network devices 215, and individually or generally as virtual network device 215). Virtual network devices 215 (VNDs 215) may include applications (App) 217-1 through 217-X (also referred to as applications 217, and individually or generally as application 217). Host 210 may support one or multiple VNDs 215 and applications 217 that provide application services and/or microservices (e.g., a task, a function, etc.) of the application service (also referred to as an application service), as described herein. The number, the type, and the arrangement of MEC devices 117 are exemplary. The number and the arrangement of communication links illustrated are also exemplary. MEC network 115 may include additional and/or different MEC devices 117 in other exemplary embodiments. For example, MEC devices 117 may include additional and/or different system or management level MEC devices 117 that are not illustrated and described for the sake of brevity.

Orchestrator 202 includes logic that manages the lifecycle of VNDs 215. According to an exemplary embodiment, orchestrator 202 may determine whether a VND 215 is instantiated, terminated, or is in another state based on usage data of an application service or a microservice, as described herein. Orchestrator 202 may include logic that performs other types of operations, such as management of application service/microservice rules and requirements, resource management, and/or other system level management functions pertaining to MEC network 115.

Controller 204 includes logic that uses lifecycle management information as a basis to determine whether a VND 215 should be created or terminated. According to an exemplary embodiment, controller 204 may store a threshold usage value and compare the number of requests for an application service of VND 215. Based on a result of the comparison, controller 204 may determine the state of one or multiple VNDs 215, as described herein. Controller 204 may include logic that generates and transmits a message, which indicates the result of the comparison, to orchestrator 202. Controller 204 may include logic that receives a response to the message from orchestrator 202, and carries out the instructions from orchestrator 202.

Ingress 206 may include logic that receives requests for application services from end devices 180 and notifies orchestrator 202 of such requests. Ingress 206 may include logic that performs other types of operations, such as authentication and authorization and/or other system level management functions.

Hosts 210 may include network devices that support the virtualization of application services. Host 210 provides various physical resources (e.g., processors, memory, storage, communication interface, etc.), software resources (e.g., operating system, etc.) and other virtualization elements (e.g., hypervisor, container engine, etc.). VNDs 215 may be implemented as containers, VMs, or another type of virtualization architecture that provides one or multiple application services for end devices 180. Application 217 may include software for an application service. Applications 217 may include one or multiple instances of the same or different application services.

Figure 3A:
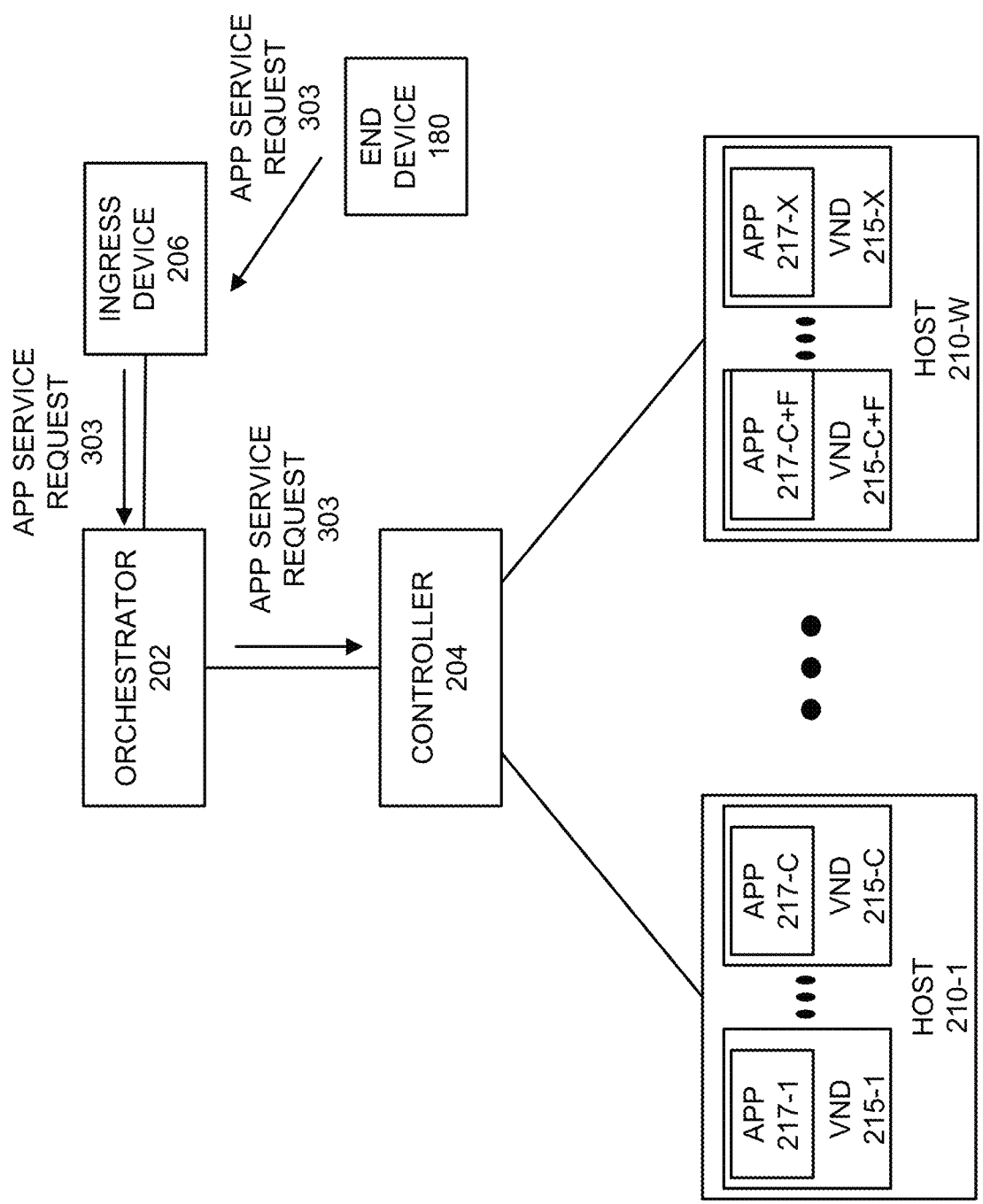
FIGS. 3A-3D are diagrams illustrating an exemplary process of an exemplary embodiment of the lifecycle management service.

FIGS. 3A-3D are diagrams illustrating an exemplary process of the lifecycle management service. For example, the process relates to an automated termination of an application service or a microservice, as described herein. Referring to FIGS. 1 and 3A, assume that one or multiple end devices 180 transmit one or multiple application service requests 303 to ingress device 206 of MEC network 115 via access network 105. According to an exemplary scenario, assume that the application service request(s) 303 pertain to the same application service or microservice. According to other exemplary scenarios, when there are multiple application service requests 303, such requests may pertain to the same or different application services or microservices. Ingress device 206 may receive application service request(s) 303 and forward the application service request(s) 303 to orchestrator 202, and in turn, orchestrator 202 may provide the application service request(s) 303 to controller 204. Alternatively, according to another exemplary scenario, although not illustrated, orchestrator 202 may not receive the application service request(s) 303, and ingress device 206 may send the application service request(s) 303 to controller 204.

Figure 3B:
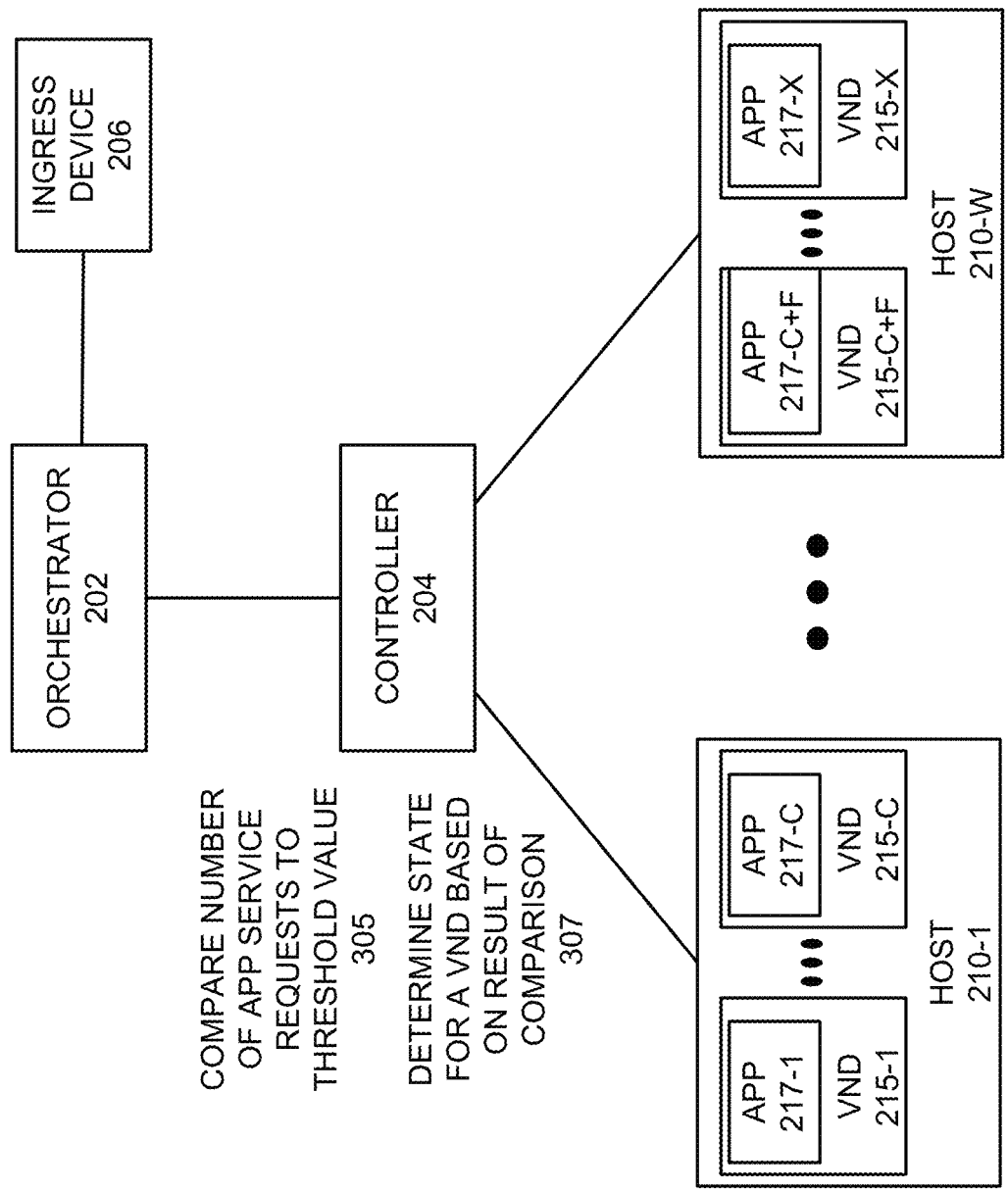

Referring to FIG. 3B, in response to receiving the application service request(s) 303, controller 204 may compare the number of requests to a threshold value 305. For example, according to an exemplary embodiment, controller 204 may store lifecycle management information. Controller 204 may use the lifecycle management information to provide a lifecycle management service, as described herein. An exemplary embodiment of the lifecycle management information is described further below.

Figure 4:
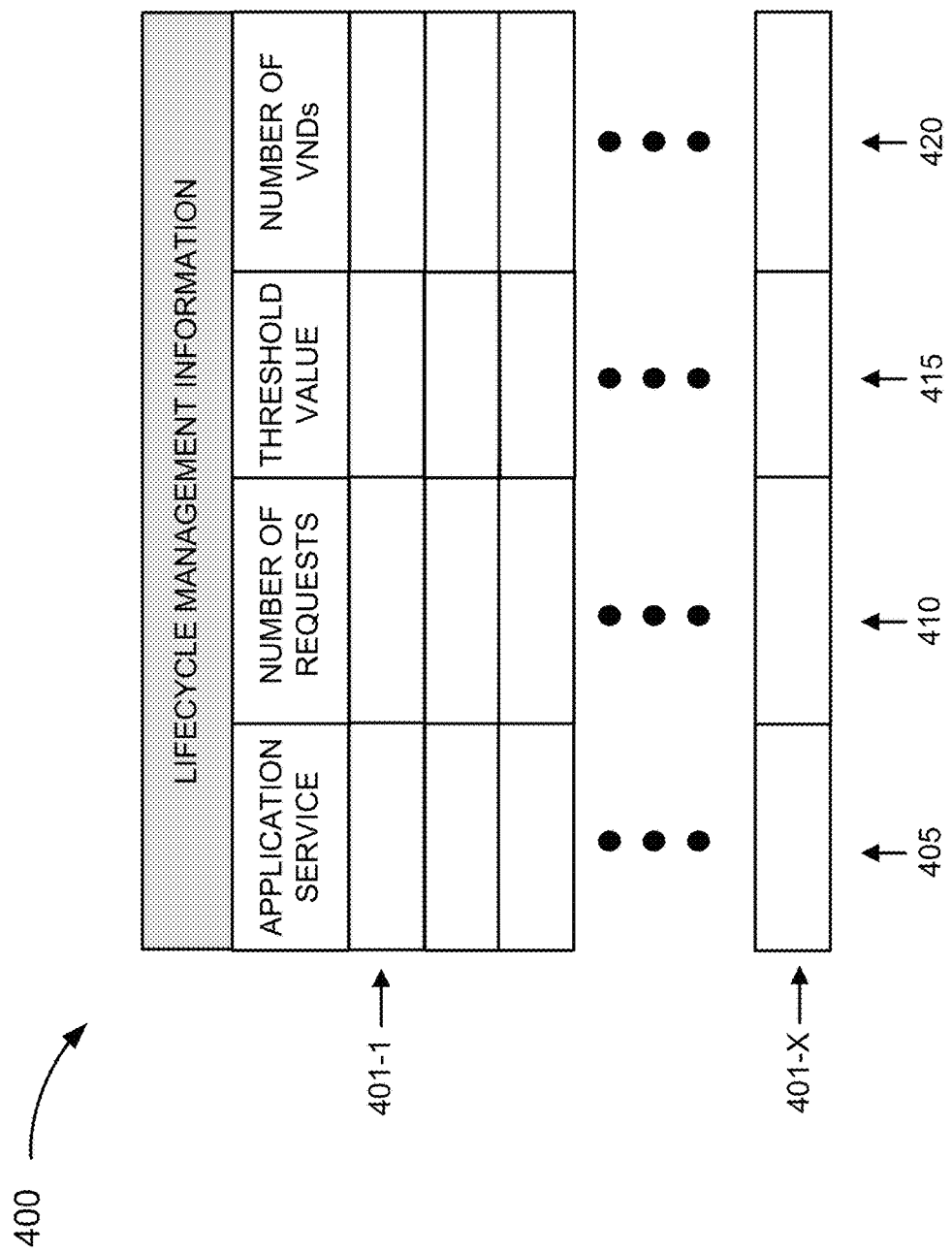
FIG. 4 is a diagram illustrating exemplary information of an exemplary embodiment of the lifecycle management service.

FIG. 4 is a diagram of exemplary lifecycle management information that may be stored in a table 400. As illustrated, table 400 may include an application service field 405, a number of requests field 410, a threshold value field 415, and a number of VNDs field 420. As further illustrated, table 400 includes records 401-1 through 401-X (also referred to as records 401, or individually or generally as record 401) that each includes a grouping of fields 405, 410, 415, and 420. Lifecycle management information is illustrated in tabular form merely for the sake of description. In this regard, lifecycle management information may be implemented in a data structure different from a table.

Application service field 405 may store data indicating an application service or a microservice. Number of requests field 410 may store data indicating the number of requests for the application service or the microservice. According to an exemplary implementation, the number of requests may indicate the number of new or incoming requests received during a configured time window. According to another exemplary implementation, the number of requests may indicate the number of new requests and currently executing requests by VNDs 215, hosts 210, etc., during a configured time window. Threshold value field 415 may store data indicating a threshold number of requests for the application service or the microservice. Number of VNDs field 420 may store data indicating the number of VNDs configured to support a numerical range of requests for the application service or the microservice, which includes the threshold value of requests.

According to other exemplary implementations, table 400 may store additional, fewer, and/or different instances of lifecycle management information in support of the lifecycle management service, as described herein.

Referring back to FIG. 3B, controller 204 may select the appropriate threshold value field 415 in table 400 based on the correlated fields 405, 410, and 420. For example, controller 204 may determine the application service or the microservice requested and the number of requests based on application service request(s) 303 or application service request(s) 303 and previously received application service request(s) (not illustrated). Additionally, or alternatively, controller 204 may determine the application service or the microservice based on an absence of application service request(s) 303 or previously received or the absence thereof of previously received application service request(s).

Controller 204 may select the number of VNDs 215 that support the threshold value of requests based on the currently active VNDs 215 that support the application service or the microservice. For example, there may be different threshold values depending on the number of currently active VNDs 215 and correlated application service or microservice.

Controller 204 may determine the state for one or multiple VNDs 215 based on the result of the comparison 307. For example, controller 204 may determine whether additional VNDs 215, fewer VNDs 215, or the same number of VNDs 215 may be used to support the new requests from the one or multiple end devices 180. According to this exemplary scenario, assume that controller 204 determines that for at least one application service or microservice, the state for VNDs 215 should change.

Figure 3C:
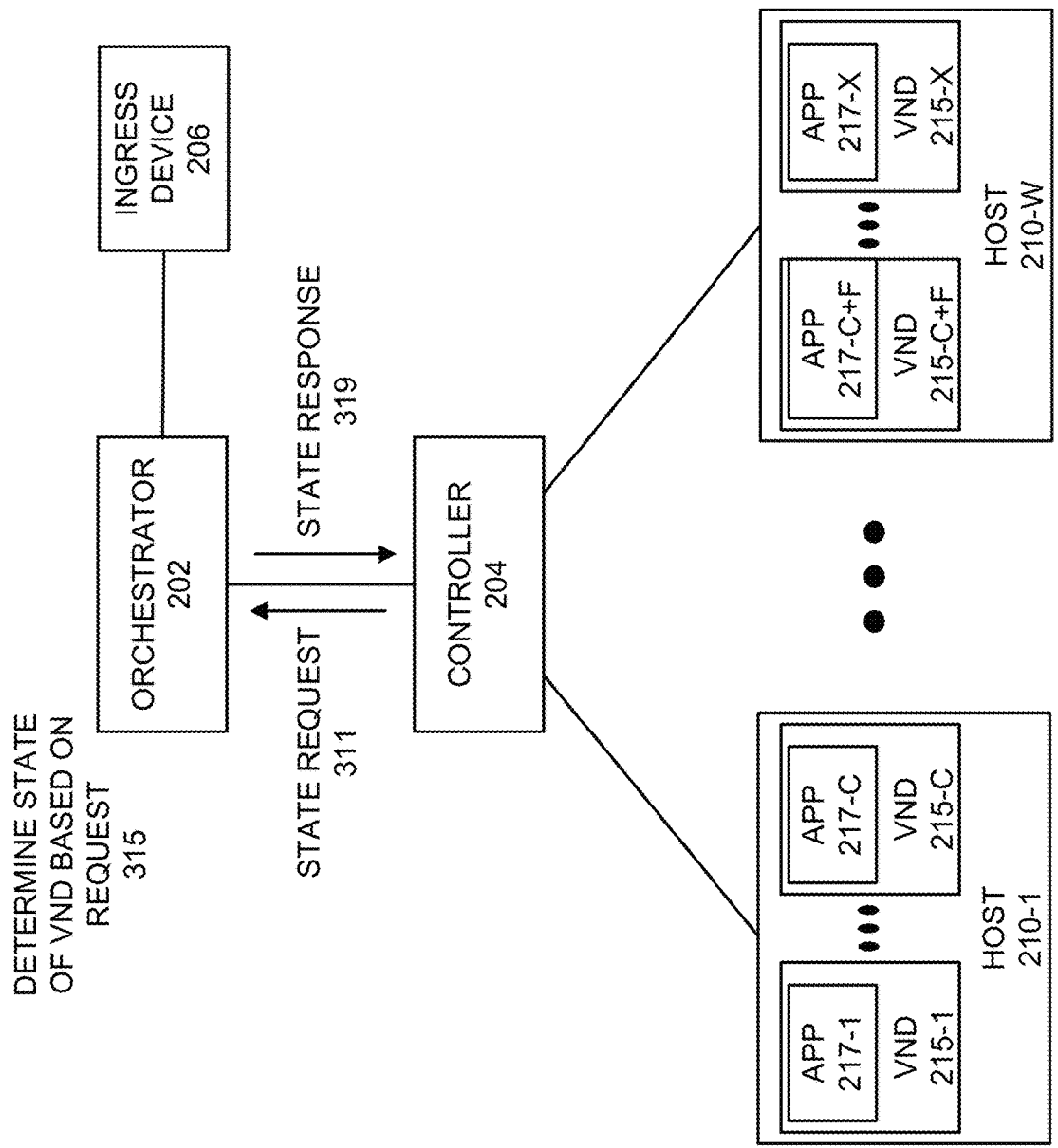

Referring to FIG. 3C, controller 204 may generate and transmit a state request 311 to orchestrator 202. The state request 311 may include data indicating that a threshold value is not satisfied (e.g., not a sufficient number of VNDs 215 or excess number of VNDs 215). According to this exemplary scenario, state request 311 may indicate that the threshold value is not satisfied based on an excess number of VNDs 215. In response to receiving state request 311, orchestrator 202 may determine a state for one or multiple VNDs 215 that provide an application service or a microservice based on the received state request 315 and system level information that orchestrator 202 may store or access. According to this exemplary scenario, orchestrator 202 may verify and instruct controller 204 to reduce the number of VNDs 215 that support an application service or a microservice. According to some exemplary scenarios, the reduction may include terminating any and all VNDs 215 that provide the application service or the microservice. According to other exemplary scenarios, the reduction may include fewer than all VNDs 215 that provide the application service or the microservice. As further illustrated, orchestrator 202 may generate and transmit a state response 319 to controller 204.

Figure 3D:
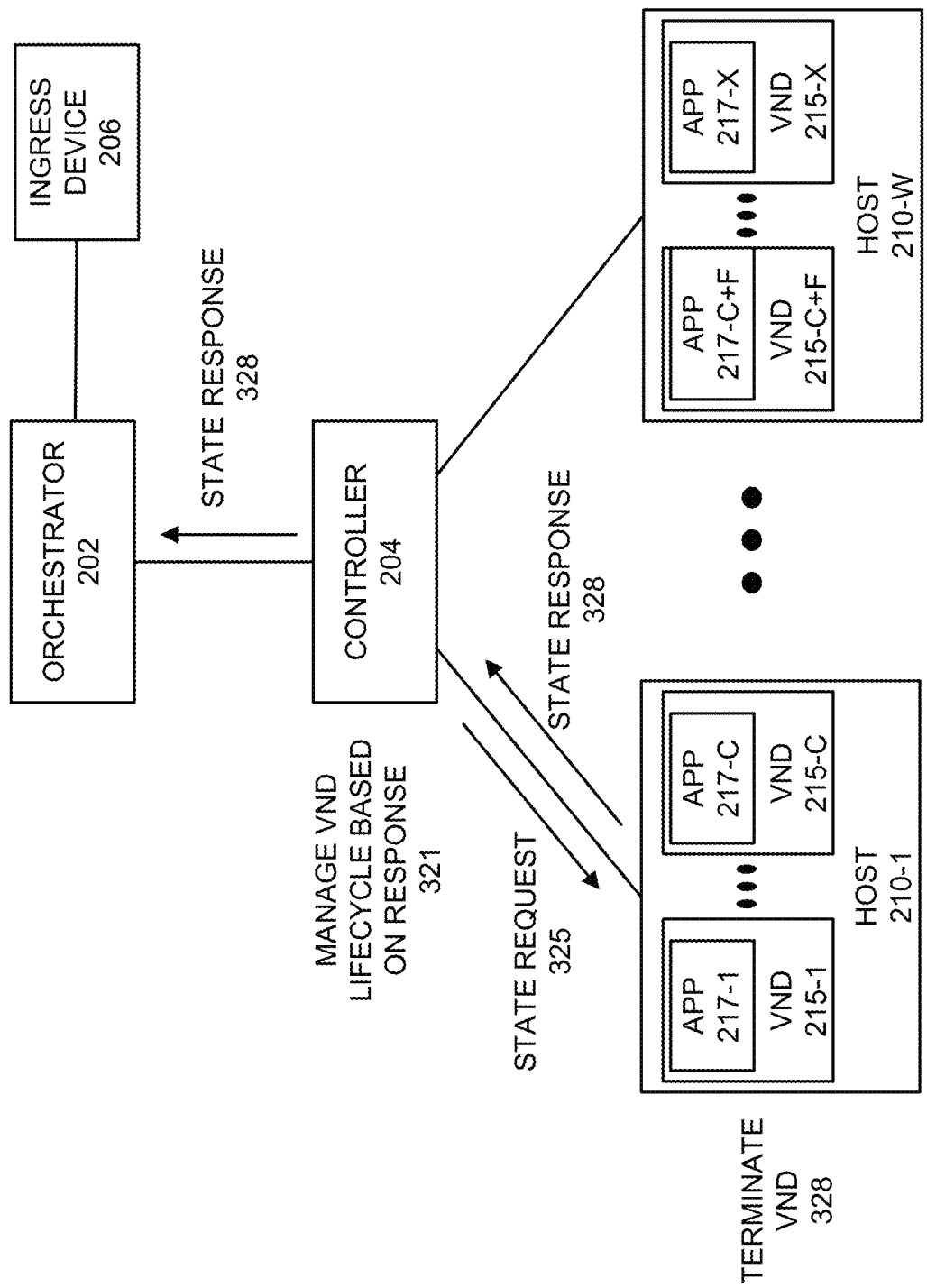

Referring to FIG. 3D, controller 204 may manage the VND lifecycle for the application service or the microservice based on the received response 321. For example, controller 204 may select host(s) 210 and VND(s) 215 that are targeted for termination. Controller 204 may generate and transmit a state request 325 to those targeted host(s) 210, and in response to receiving state request 325, host 210 may terminate the appropriate VND 328. As further illustrated, host 210 may generate and transmit a state response 328 to controller 204. State response 328 may indicate the termination of VND 215 and associated application service or microservice. Controller 204 may store this information and may also forward state response 328 to orchestrator 202.

FIGS. 3A-3D illustrate an exemplary process of the lifecycle management service, according to other exemplary embodiments, the process may include additional, different, and/or fewer steps. For example, controller 204 may perform various operations, as described herein, not in response to receiving application service requests, but continuously, periodically, or in response to another type of triggering event. In this regard, controller 204 may identify a triggering event and compare the number of requests to the lifecycle management information in response to the triggering event.

As previously described, the lifecycle management service may use other types of lifecycle management information to terminate an application service or a microservice. Exemplary instances of the other types of lifecycle management information are described herein.

Figure 5:
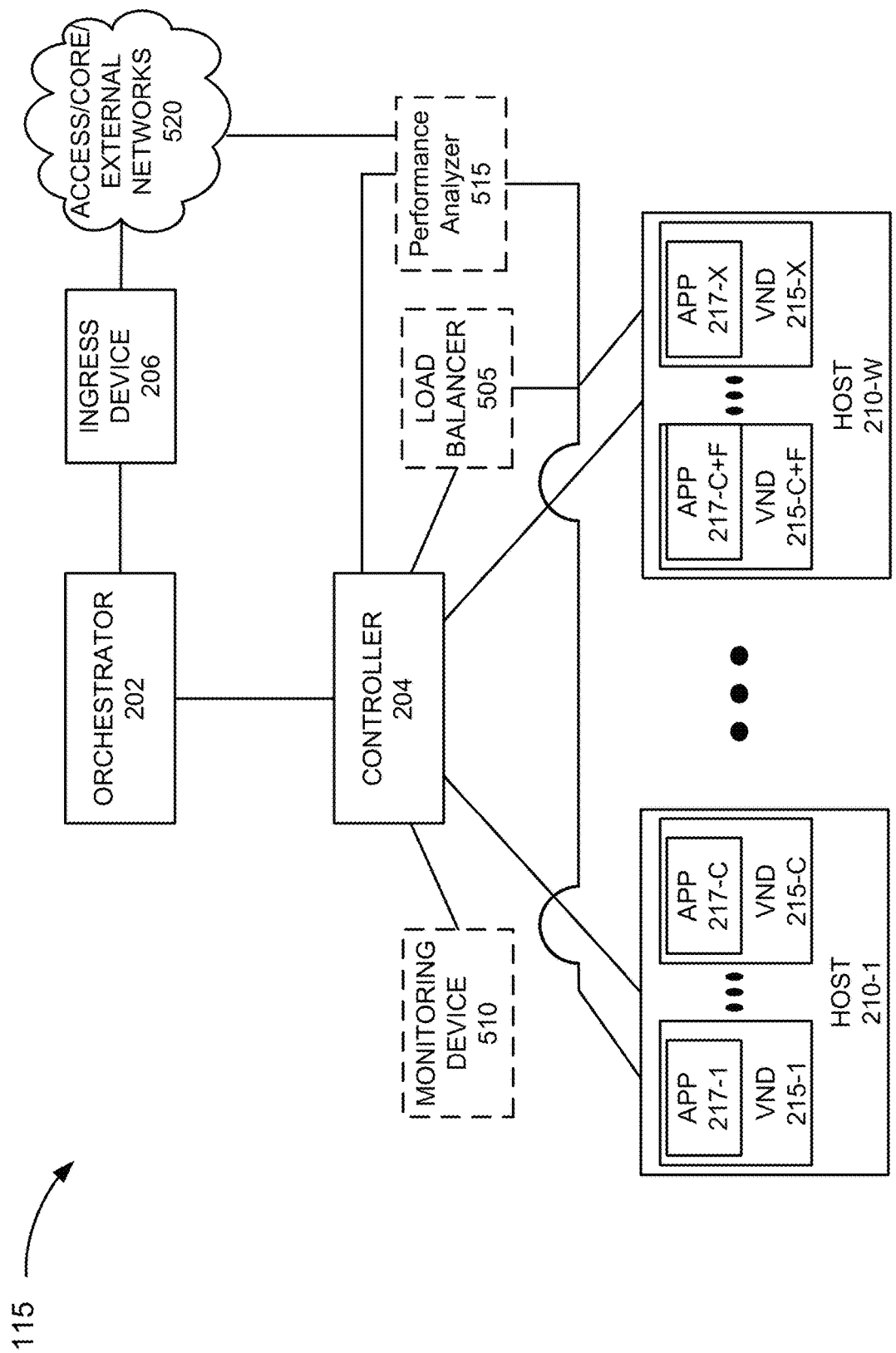
FIG. 5 is a diagram illustrating another exemplary MEC network that may be used in support of the lifecycle management service.

FIG. 5 is a diagram illustrating another exemplary embodiment of MEC devices 117 of a MEC network 115 that provides the lifecycle management service. As illustrated, MEC network 115 may include orchestrator 202, controller 204, ingress device 206, and hosts 210, which have been previously described. Additionally, MEC network 115 may include other types of MEC devices 117, such as a load balancer 505, a monitoring device 510, and a performance analyzer 515. The number, the type, and the arrangement of MEC devices 117 are exemplary. The number and the arrangement of communication links illustrated are also exemplary. MEC network 115 may include additional and/or different MEC devices 117 in other exemplary embodiments. For example, MEC devices 117 may include additional and/or different system or management level MEC devices 117 that are not illustrated and described for the sake of brevity. Also illustrated in FIG. 5, although not part of MEC 115, is access/core/networks 520, which corresponds to access network 105, core network 120, and/or external network 125.

According to an exemplary embodiment, the lifecycle management service may provide that load balancer 505, monitoring device 510, and/or performance analyzer 515 provide lifecycle management information to controller 204. Controller 204 may use this lifecycle management information as a basis to determine whether to terminate VND 215 and associated application service or microservice.

Load balancer 505 may include logic that distributes traffic among controllers 204 and associated hosts 210 and VNDs 215. Load balancer 505 may also include logic that provides DNS load balancing. Load balancer 505 may collect lifecycle management information from controllers 204, DNS servers (not illustrated), and/or other types of MEC devices 117 (e.g., hosts 210, etc.). For example, the lifecycle management information may indicate utilization of each controller 204 and associated hosts 210 according to locale, application service, server pools, and/or other criteria. Also, for example, the lifecycle management information may indicate utilization of domains in the DNS.

Monitoring device 510 may include logic that monitors security and/or health of controllers 204, hosts 210, and/or VNDs 215. Monitoring device 510 may collect lifecycle management information from controllers 204, hosts 210, and/or VNDs 215 that pertains to the security and/or health of these MEC devices 117. For example, the lifecycle management information may indicate the presence or absence of viruses, malware, etc., and security related information (e.g., data loss, data integrity, authentication, authorization, kernel exploit, container breakouts, denial-of-service, etc.).

Performance analyzer 515 may include logic that monitors performance metrics pertaining to network resources. For example, performance analyzer 515 may monitor usage of network resources (e.g., physical, logical, virtual) at host 210 and/or controller 204, such as a processor (e.g., a central processing unit (CPU), a graphic processing unit (GPU), a neural processing unit (NPU), etc.), a memory (e.g., a read only memory (ROM), a random access memory (RAM), a solid state memory, etc.), a storage device (e.g., a hard drive, a non-volatile storage component, etc.), and/or a communication interface (e.g., a transmitter, a receiver, a buffer, a port, etc.). The physical resources may further include other types of network resources that are external to a MEC device 117 (e.g., host 210, controller 204, etc.), such as communication links between hosts 210, between other networks (e.g., access/core/external networks 520), between hosts 210 and end device 180, or other communication links and/or network devices that support the provisioning of the application service or the microservice. The logical resources may be a partition of a physical resource dedicated to or allocated to host 210 or shared between hosts 210. The virtual resources may be an abstraction of physical and/or logical resources. Performance analyzer 515 may use various techniques, such as polling or using interrupts to obtain lifecycle management information. According to an exemplary embodiment, the lifecycle management service may calculate a resource usage value (e.g., used resources/available, a percentage (e.g., 50%, etc.), etc.) pertaining to the resource based on the monitoring.

According to an exemplary embodiment, the lifecycle management service includes dynamically processing the application service based on a current resource usage and one or multiple criteria. According to various exemplary embodiments, the one or multiple criteria include a priority associated with the application service relative to other application services, a priority or an importance associated with content and/or information of the application service relative to other content and/or information of the application service, a subscription level or service tier of a user or the end device to which the application service is being provided, and/or a performance metric indicator (e.g., Quality of Experience (QoE) Score, a Mean Opinion Score (MOS) associated with users and/or application services, a Key Performance Indicator (KPI)).

Figure 6A:
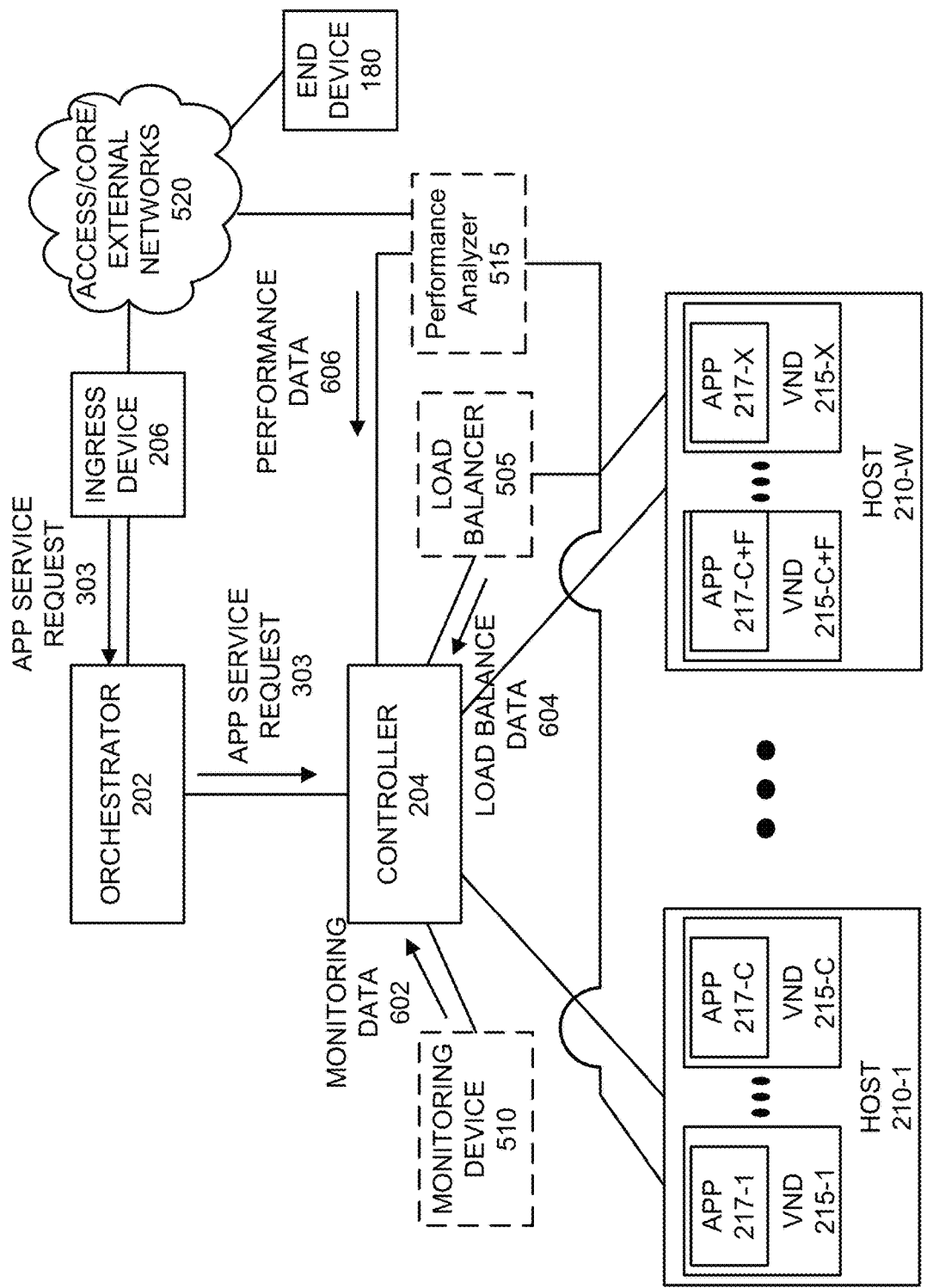
FIGS. 6A and 6B are diagrams illustrating another exemplary process of an exemplary embodiment of the lifecycle management service.
Figure 6B:
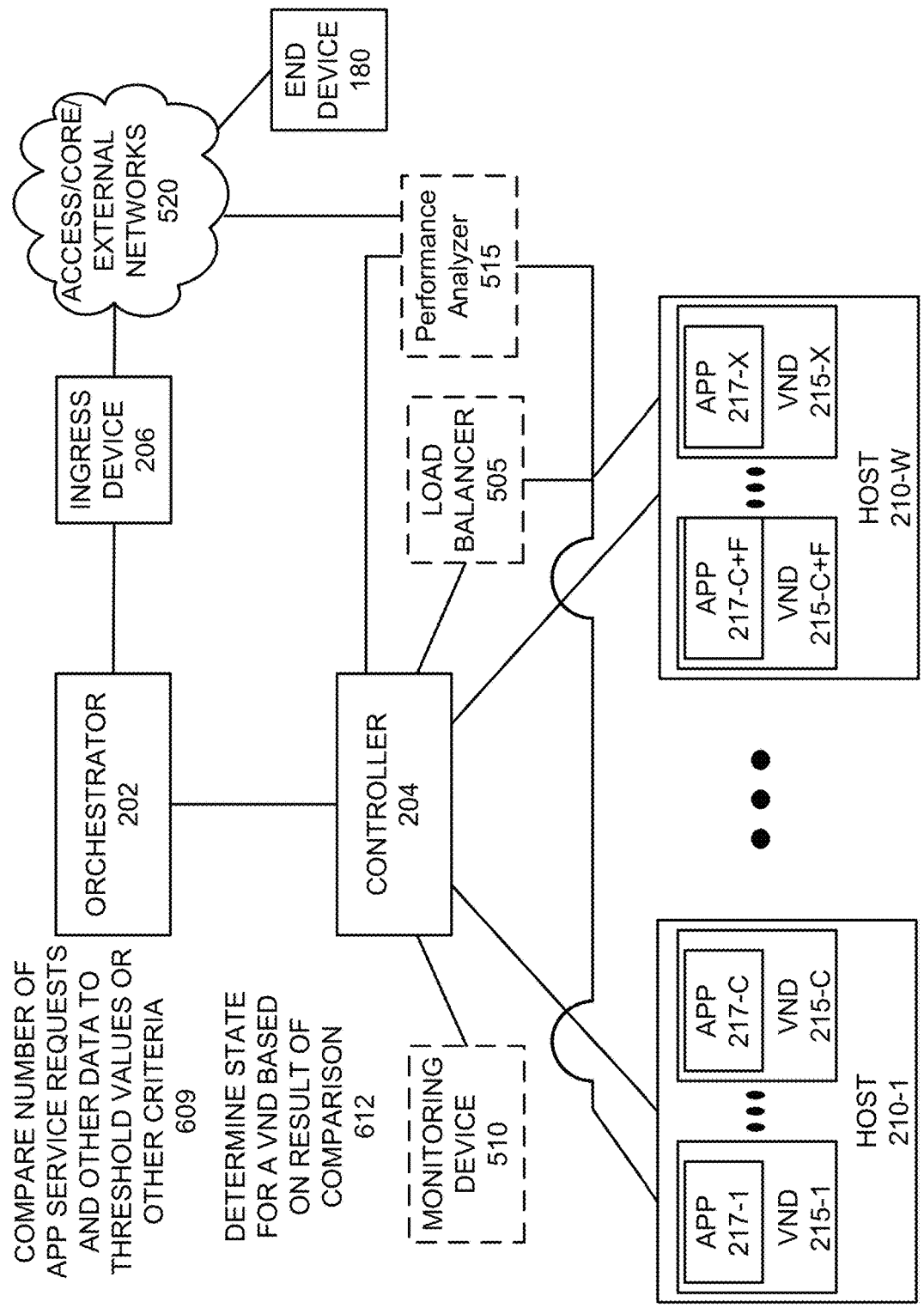

FIGS. 6A and 6B are diagrams illustrating another exemplary process of the lifecycle management service. For example, the process relates to an automated termination of an application service or a microservice, as described herein. Referring to FIG. 6A, in a manner similar to that previously described in relation to FIG. 3A, controller 204 may receive application service request 303 and other types of data, such as monitoring data 602, load balance data 604, and/or performance data 606. Referring to FIG. 6B, in response to receiving the application service request(s) 303 and other data, controller 204 may compare the number of requests and other data to threshold values or other criteria 609. For example, according to an exemplary embodiment, controller 204 may store lifecycle management information. Controller 204 may use the lifecycle management information to provide a lifecycle management service, as described herein. An exemplary embodiment of the lifecycle management information is described further below.

Figure 7:
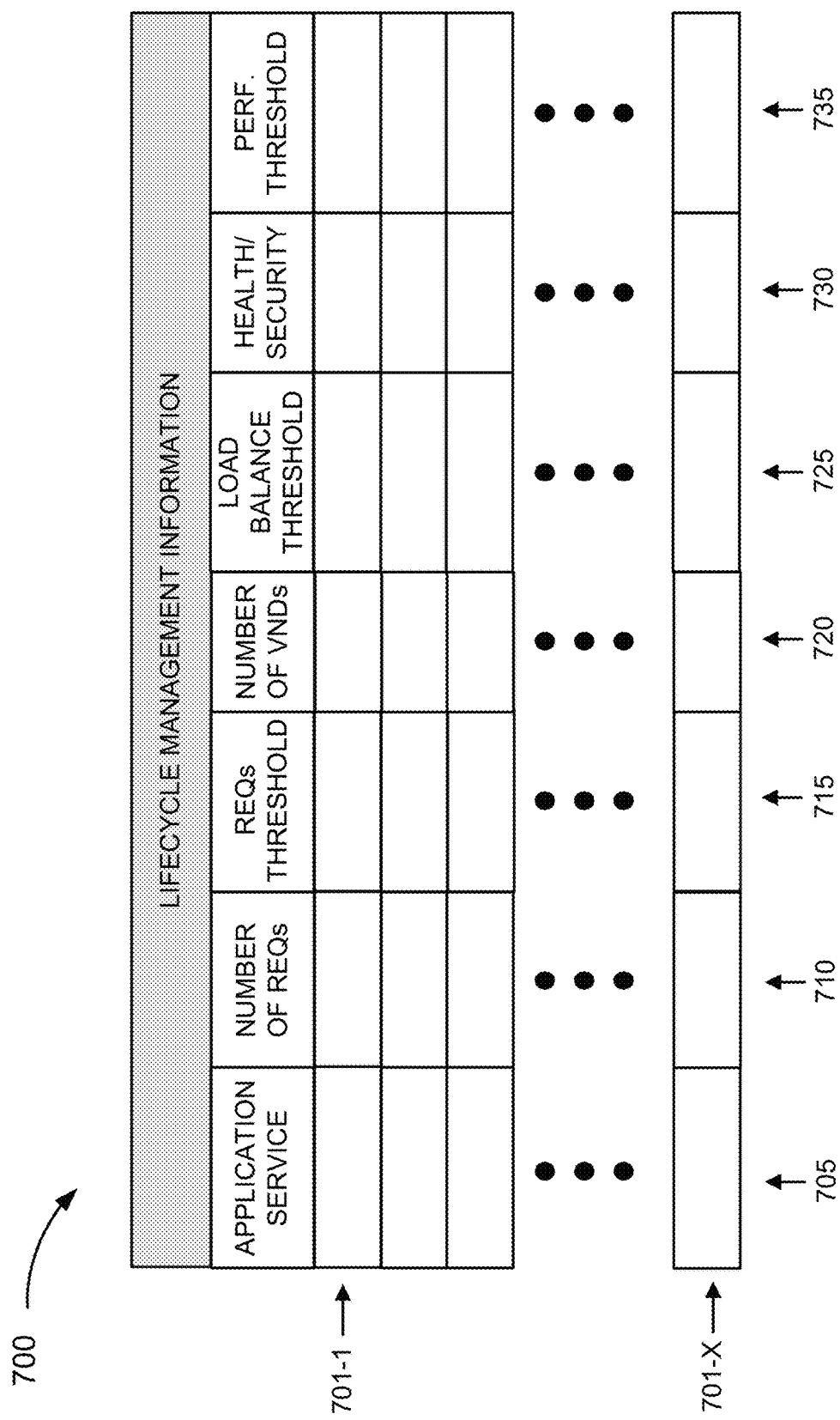
FIG. 7 is a diagram illustrating exemplary information of another exemplary embodiment of the lifecycle management service.

FIG. 7 is a diagram of exemplary lifecycle management information that may be stored in a table 700. As illustrated, table 700 may include an application service field 705, a number of requests field 710, a requests threshold field 715, a number of VNDs field 720, a load balance threshold field 725, a health/security field 730, and a performance threshold field 735. As further illustrated, table 700 includes records 701-1 through 701-X (also referred to as records 701, or individually or generally as record 701) that each includes a grouping of fields 705 through 735. Lifecycle management information is illustrated in tabular form merely for the sake of description. In this regard, lifecycle management information may be implemented in a data structure different from a table.

Fields 705-720 may store data similar to the data previously described in relation to fields 405-420 of FIG. 4. Load balance threshold field 725 may store data indicating utilization and/or load threshold values pertaining to hosts 210, controllers 204, and/or other types of MEC devices 117 or components thereof (e.g., VNDs 215, etc.) that provide the application service or the microservice. Health/security field 730 may store rules or policies pertaining to the presence or absence of health or security-related issues and MEC devices 117 (e.g., hosts 210, VNDs 215, etc.). Performance threshold field 735 may store data indicating threshold values pertaining to performance metrics (e.g., packet loss, throughput, bandwidth, latency, etc.) in relation to communication and application service/microservice performance.

Referring back to FIG. 6B, controller 204 may select the appropriate threshold value field 715 in table 700 based on the correlated fields 705, 710, and 720. Additionally, controller 204 may use one or more of fields 725, 730, and 735 that correlate to those fields 705, 710, and 720. Controller 204 may determine the state for one or multiple VNDs 215 based on the result of the comparison 307. For example, controller 204 may determine whether additional VNDs 215, fewer VNDs 215, or the same number of VNDs 215 may be used to support requests from the one or multiple end devices 180. According to this exemplary scenario, assume that controller 204 determines that for at least one application service or microservice, the state for VNDs 215 should change (e.g., an excess number of VNDs 215). In a manner similar to that previously described in relation to FIGS. 3C and 3D, controller 204 may terminate VNDs 215.

FIGS. 6A and 6B illustrate another exemplary process of the lifecycle management service, according to other exemplary embodiments, the process may include additional, different, and/or fewer steps. For example, controller 204 may perform various operations, as described herein, not in response to receiving application service requests, but continuously, periodically, or in response to another type of triggering event.

As previously described, the lifecycle management service may provide for the instantiation or start-up of an application service or a microservice based on received DNS requests. In contrast to existing approaches that require a manual start-up, the lifecycle management service may perform the instantiation as an automated process.

Figure 8:
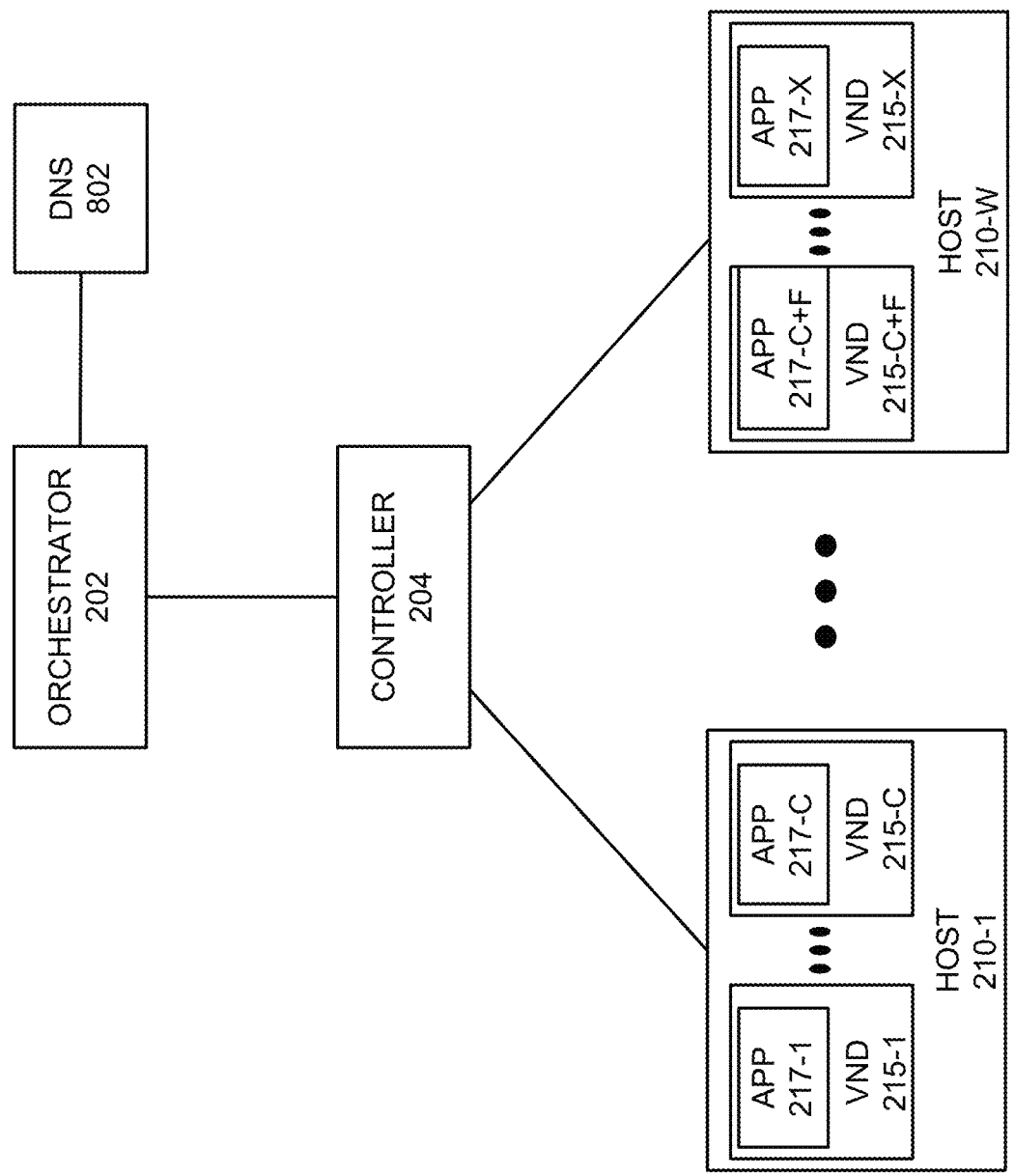
FIG. 8 is a diagram illustrating yet another exemplary MEC network that may be used in support of the lifecycle management service.

FIG. 8 is a diagram illustrating yet another exemplary embodiment of MEC devices 117 of a MEC network 115 that provides the lifecycle management service. As illustrated, MEC network 115 may include orchestrator 202, controller 204, and hosts 210, which have been previously described. Additionally, MEC network 115 may include other types of MEC devices 117, such as a DNS 802. DNS 802 may include logic that provides DNS resolution services for application services and/or microservices provided by MEC network 115.

The number, the type, and the arrangement of MEC devices 117 are exemplary. The number and the arrangement of communication links illustrated are also exemplary. MEC network 115 may include additional and/or different MEC devices 117 in other exemplary embodiments. For example, MEC devices 117 may include additional and/or different system or management level MEC devices 117 that are not illustrated and described for the sake of brevity.

Figure 9A:
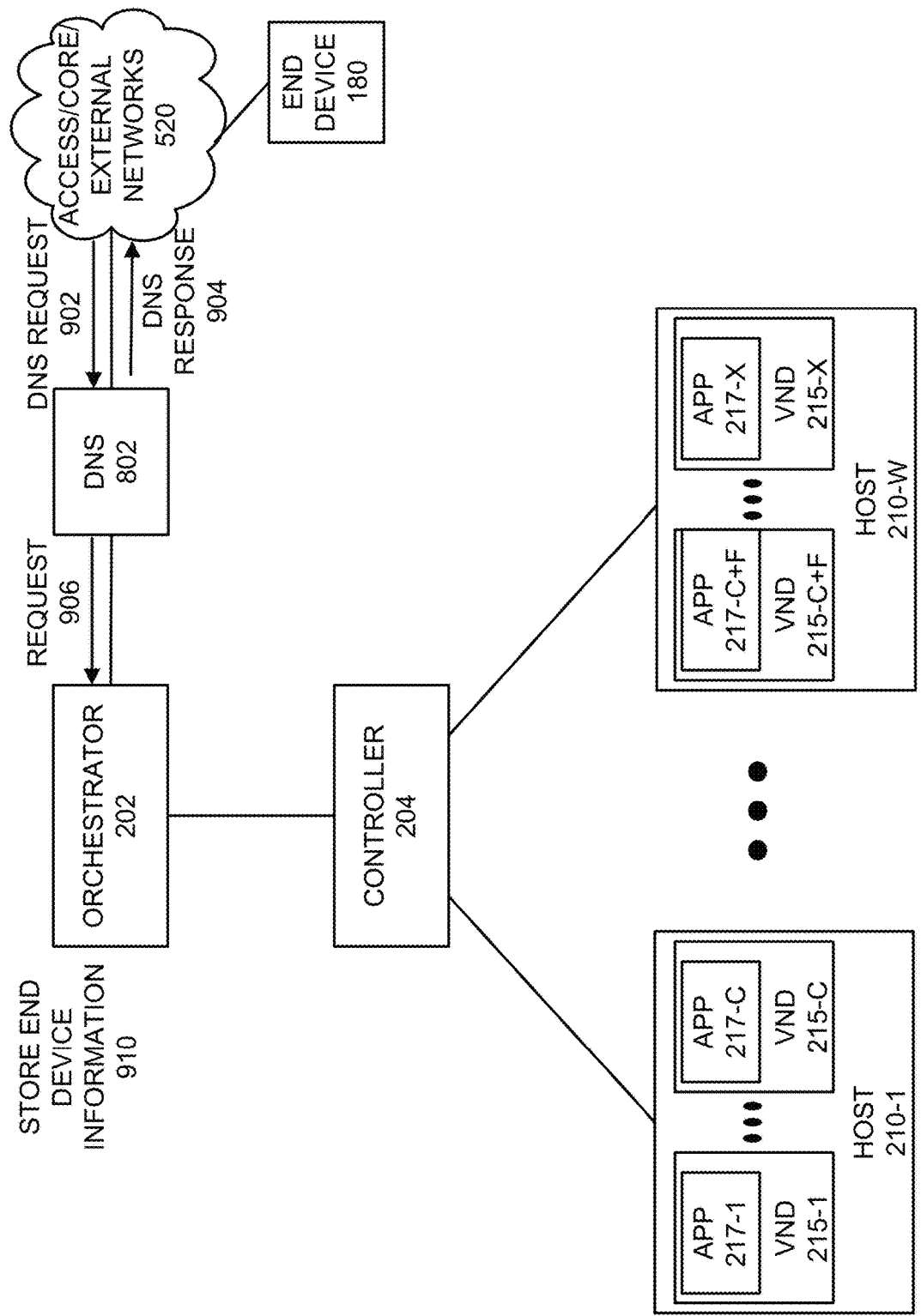
FIGS. 9A and 9B are diagrams illustrating yet another exemplary process of an exemplary embodiment of the lifecycle management service.
Figure 9B:
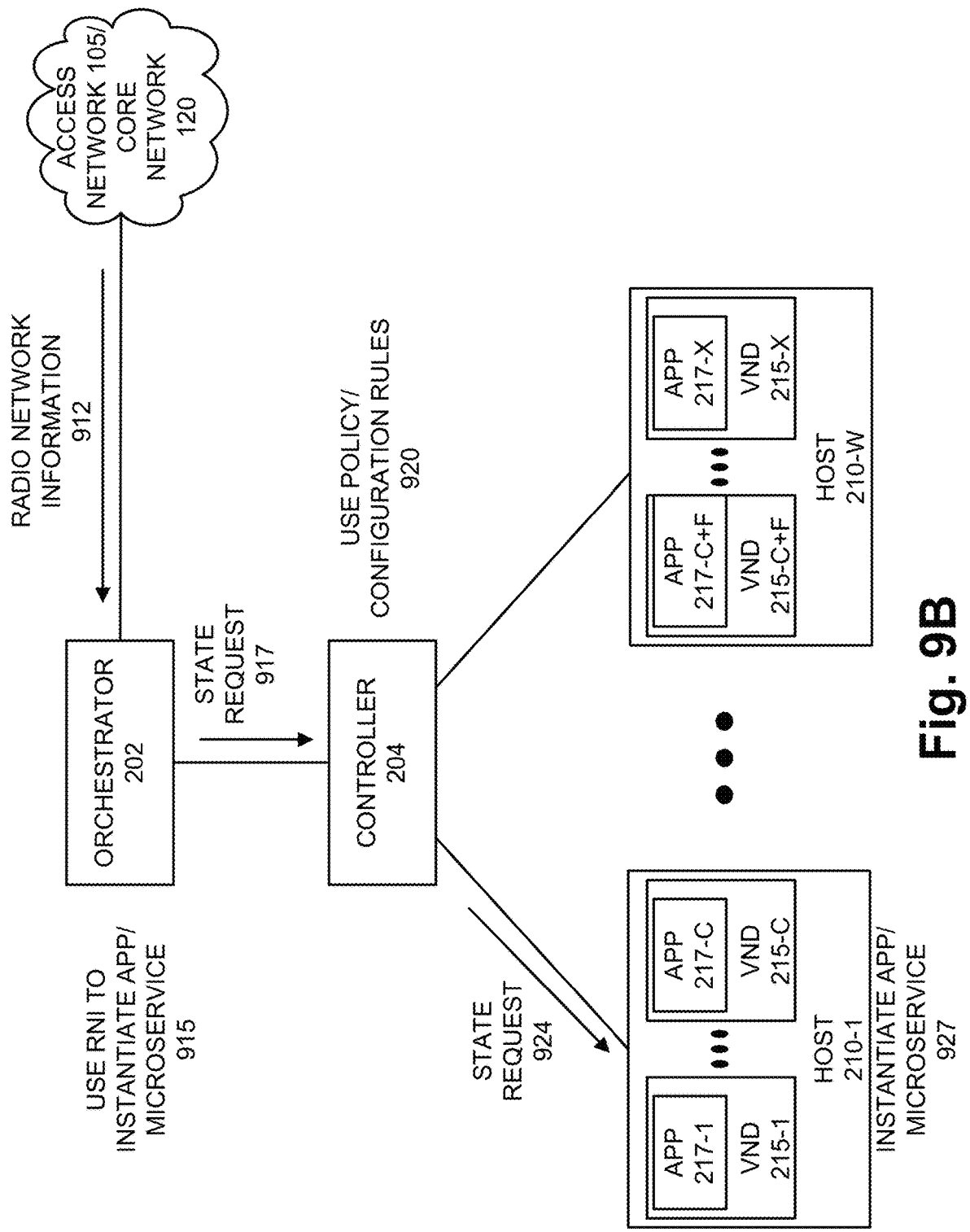

FIGS. 9A and 9B are diagrams illustrating still another exemplary process of the lifecycle management service. For example, the process relates to an automated instantiation of an application service or a microservice, as described herein. Referring to FIG. 9A, according to an exemplary scenario, assume that end device 180 transmits a DNS request 902 that is received via access/core/external networks 520. Access/core/external networks 520 may include a DNS (not illustrated), which may direct the DNS request 902 to DNS 802. DNS 802 may resolve the DNS request and provide a DNS response 904, which includes the DNS resolution, to end device 180. Additionally, in response to receiving DNS request 902, DNS 802 may transmit a request 906 to orchestrator 202. Request 906 may indicate an application service or a microservice that is associated with the DNS request 902 (e.g., based on a domain name, a server name, etc.). Request 906 may also indicate a network address (e.g., an Internet Protocol (IP) address, etc.) of end device 180 from which DNS request 902 originated. Orchestrator 202 may store this end device information 910.

Referring to FIG. 9B, orchestrator 202 may obtain radio network information (RNI) 912, relating to end device 180, from core network 120 or access network 105. For example, orchestrator 202 may subscribe to a radio network information service (RNIS) and obtain the radio network information from a network exposure function (NEF) (not illustrated) or another type of core device 122 of core network 120, or access device 107 of access network 105. The IP address of end device 180 may be used in this process. The radio network information may include data indicating the current serving radio cell of end device 180 and/or other information pertaining to end device 180 (e.g., end device context, radio network conditions, radio access bearers, etc.). In response to obtaining the RNI, orchestrator 202 may select a suitable controller 204 to instantiate the application service or the microservice 915 to be used to service end device 180 based on the location of end device 180 and/or other RNI. As illustrated, orchestrator 202 may generate and transmit a state request 917 to controller 204. State request 917 may indicate the application service or the microservice to instantiate. In response to receiving state request 917, controller 204 may invoke an instantiation procedure. The instantiation procedure may include using policy and configuration rules 920 to select a host 210, generating a state request 924, and transmitting state request 924 to the selected host 210. Host 210 may instantiate the application service or the microservice in response to receiving state request 924.

FIGS. 9A and 9B illustrate another exemplary process of the lifecycle management service, according to other exemplary embodiments, the process may include additional, different, and/or fewer steps. For example, orchestrator 202 may use service registry information pertaining to applications/microservices in MEC network 115 to determine whether to instantiate the application service or the microservice. Additionally, or alternatively, orchestrator 202 may use load balancing information to select controller 204.

Figure 10:
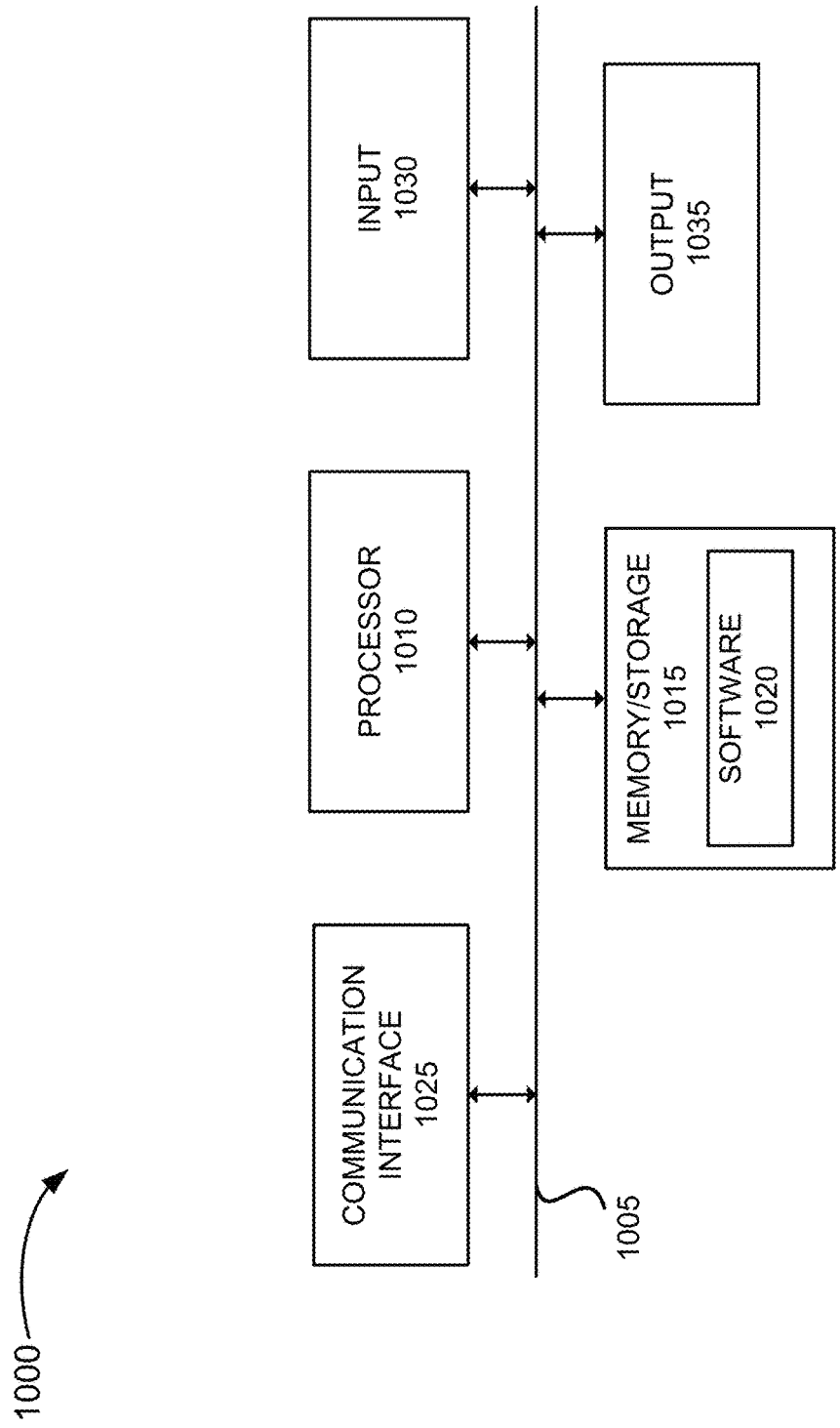
FIG. 10 is a diagram illustrating exemplary components of a device that may correspond to one or more of the devices illustrated and described herein.

FIG. 10 is a diagram illustrating exemplary components of a device 1000 that may be included in one or more of the devices described herein. For example, device 1000 may correspond to MEC device 117 of MEC network 115 or other types of network devices of other types of networks, as described herein. As illustrated in FIG. 10, device 1000 includes a bus 1005, a processor 1010, a memory/storage 1015 that stores software 1020, a communication interface 1025, an input 1030, and an output 1035. According to other embodiments, device 1000 may include fewer components, additional components, different components, and/or a different arrangement of components than those illustrated in FIG. 10 and described herein.

Bus 1005 includes a path that permits communication among the components of device 1000. For example, bus 1005 may include a system bus, an address bus, a data bus, and/or a control bus. Bus 1005 may also include bus drivers, bus arbiters, bus interfaces, clocks, and so forth.

Processor 1010 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 1010 may be implemented as hardware (e.g., a microprocessor, etc.), a combination of hardware and software (e.g., a SoC, an ASIC, etc.), may include one or multiple memories (e.g., cache, etc.), etc.

Processor 1010 may control the overall operation or a portion of operation(s) performed by device 1000. Processor 1010 may perform one or multiple operations based on an operating system and/or various applications or computer programs (e.g., software 1020). Processor 1010 may access instructions from memory/storage 1015, from other components of device 1000, and/or from a source external to device 1000 (e.g., a network, another device, etc.). Processor 1010 may perform an operation and/or a process based on various techniques including, for example, multithreading, parallel processing, pipelining, interleaving, etc.

Memory/storage 1015 includes one or multiple memories and/or one or multiple other types of storage mediums. For example, memory/storage 1015 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 1015 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 1015 may include drives for reading from and writing to the storage medium.

Memory/storage 1015 may be external to and/or removable from device 1000, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 1015 may store data, software, and/or instructions related to the operation of device 1000.

Software 1020 includes an application or a program that provides a function and/or a process. As an example, with reference to MEC device 117, software 1020 may include an application that, when executed by processor 1010, provides a function of the lifecycle management service, as described herein. Software 1020 may also include firmware, middleware, microcode, hardware description language (HDL), and/or other form of instruction. Software 1020 may also be virtualized. Software 1020 may further include an operating system (OS) (e.g., Windows, Linux, Android, proprietary, etc.).

Communication interface 1025 permits device 1000 to communicate with other devices, networks, systems, and/or the like. Communication interface 1025 includes one or multiple wireless interfaces and/or wired interfaces. For example, communication interface 1025 may include one or multiple transmitters and receivers, or transceivers. Communication interface 1025 may operate according to a protocol stack and a communication standard. Communication interface 1025 may include an antenna. Communication interface 1025 may include various processing logic or circuitry (e.g., multiplexing/de-multiplexing, filtering, amplifying, converting, error correction, application programming interface (API), etc.). Communication interface 1025 may be implemented as a point-to-point interface, a service based interface, etc.

Input 1030 permits an input into device 1000. For example, input 1030 may include a keyboard, a mouse, a display, a touchscreen, a touchless screen, a button, a switch, an input port, speech recognition logic, and/or some other type of visual, auditory, tactile, etc., input component. Output 1035 permits an output from device 1000. For example, output 1035 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 1000 may be implemented in the same manner. For example, device 1000 may be instantiated, spun up, spun down, terminated, etc., using well-known virtualization techniques.

Device 1000 may perform a process and/or a function, as described herein, in response to processor 1010 executing software 1020 stored by memory/storage 1015. By way of example, instructions may be read into memory/storage 1015 from another memory/storage 1015 (not shown) or read from another device (not shown) via communication interface 1025. The instructions stored by memory/storage 1015 cause processor 1010 to perform a process described herein. Alternatively, for example, according to other implementations, device 1000 performs a process described herein based on the execution of hardware (processor 1010, etc.).

Figure 11:
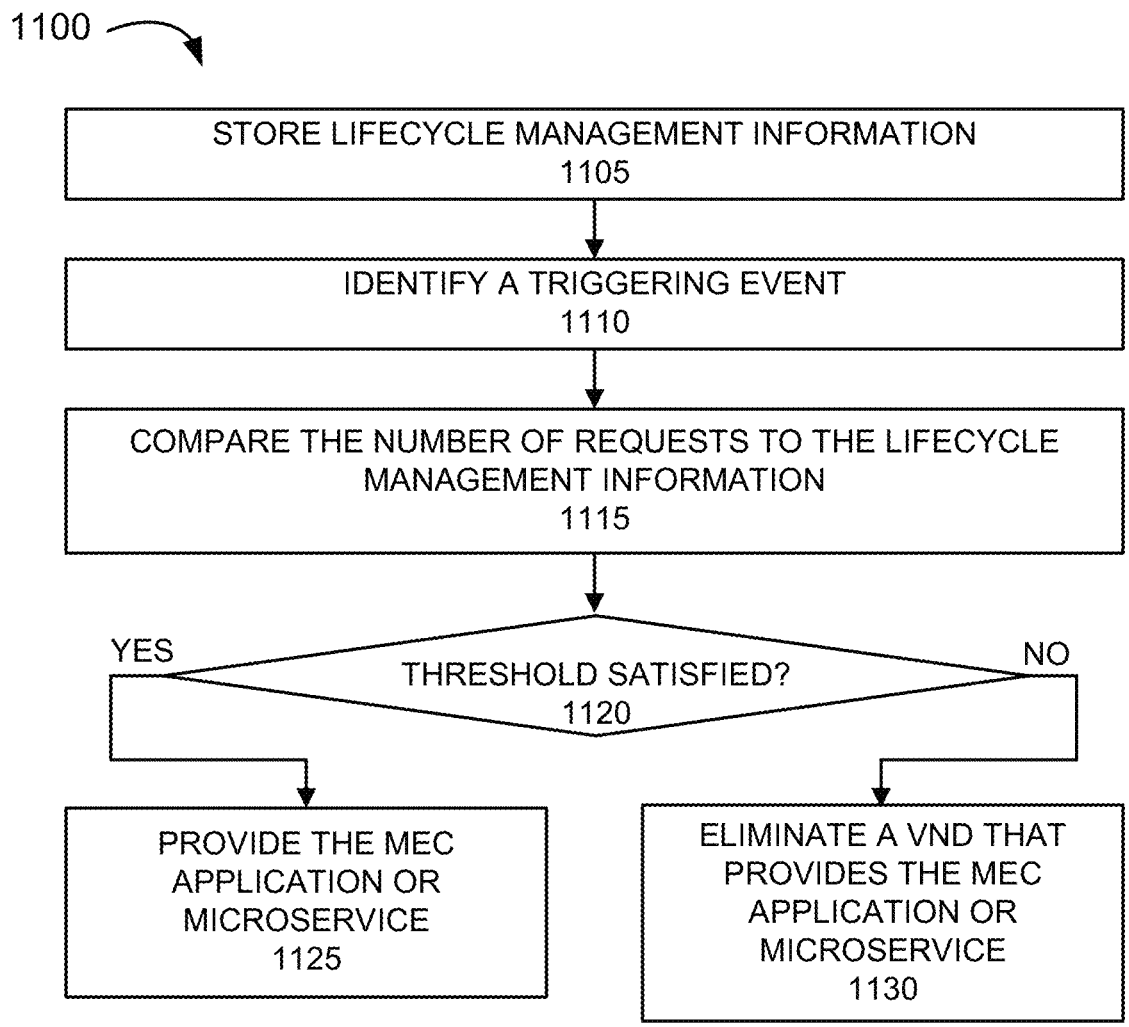
FIG. 11 is a flow diagram illustrating an exemplary process of an exemplary embodiment of the lifecycle management service.

FIG. 11 is a flow diagram illustrating an exemplary process 1100 of an exemplary embodiment of the lifecycle management service. According to an exemplary embodiment, MEC device 117 (e.g., controller 204, a VIM, an edge controller, or another type of MEC device 117 that may control or manage edge servers, hosts, microservices, etc.) may perform, in whole or in part, steps of process 1100. According to other exemplary embodiments, other types of similarly functioning network devices of an application service layer network (e.g., an IMS, a fog network, an RCS network, etc.) may perform, in whole or in part, the steps of process 1100, as described herein. According to an exemplary implementation, processor 1010 executes software 1020 to perform a step illustrated in FIG. 11, and described herein. Alternatively, a step illustrated in FIG. 11 and described herein, may be performed by execution of only hardware. Process 1100 may be performed as an automated process and may include the termination a MEC application service or microservice.

Referring to FIG. 11, in block 1105, lifecycle management information may be stored. For example, MEC device 117 of MEC network 115 may store or have access to another network device (e.g., a storage device) that stores lifecycle management information, as described herein. According to an exemplary embodiment, the lifecycle management information includes a threshold value pertaining to a number of application service requests.

In block, 1110, a triggering event may be identified. For example, MEC device 117 may identify various types of triggering events, such as the receipt of an application service request or the absence of an application service request from an end device over a configured time window. Alternatively, the triggering event may be the expiration of a periodic time window.

In block 1115, the number of requests may be compared to the lifecycle management information. For example, MEC device 117 may compare the number of MEC application service requests to the lifecycle management information. The number of requests may be new requests or new requests and currently executing requests by VNDs 215.

In block 1120, it may be determined whether the threshold value has been satisfied. For example, MEC device 117 may determine whether the threshold value of the lifecycle management information has been satisfied based on the result of the comparison. When it is determined that the threshold value is satisfied (block 1120—YES), the MEC application service or microservice may be provided (block 1125). For example, MEC device 117 may select host 210 and/or VND 215 to execute the MEC application service requests. When it is determined that the threshold value is not satisfied (block 1120—NO), a VND that provides the MEC application service or microservice may be terminated (block 1130). For example, MEC device 117 may terminate one or multiple hosts 210 and/or VNDs 215 that provide the MEC application service or the microservice. As previously described, MEC device 117 may communicate with orchestrator 202 before termination of hosts 210 and/or VNDs 215.

FIG. 11 illustrates an exemplary process 1100 of the lifecycle management service, however, according to other embodiments, process 1100 may include additional operations, fewer operations, and/or different operations than those illustrated in FIG. 11, and described herein. For example, as previously described, process 1100 may include a step that includes MEC device 117 using other types of lifecycle management information to determine whether to terminate host 210 and/or VND 215. For example, MEC device 117 may use load balancing information, monitoring information, and/or performance information, as previously described. This additional information may be used in combination with the number of requests or not.

Figure 12:
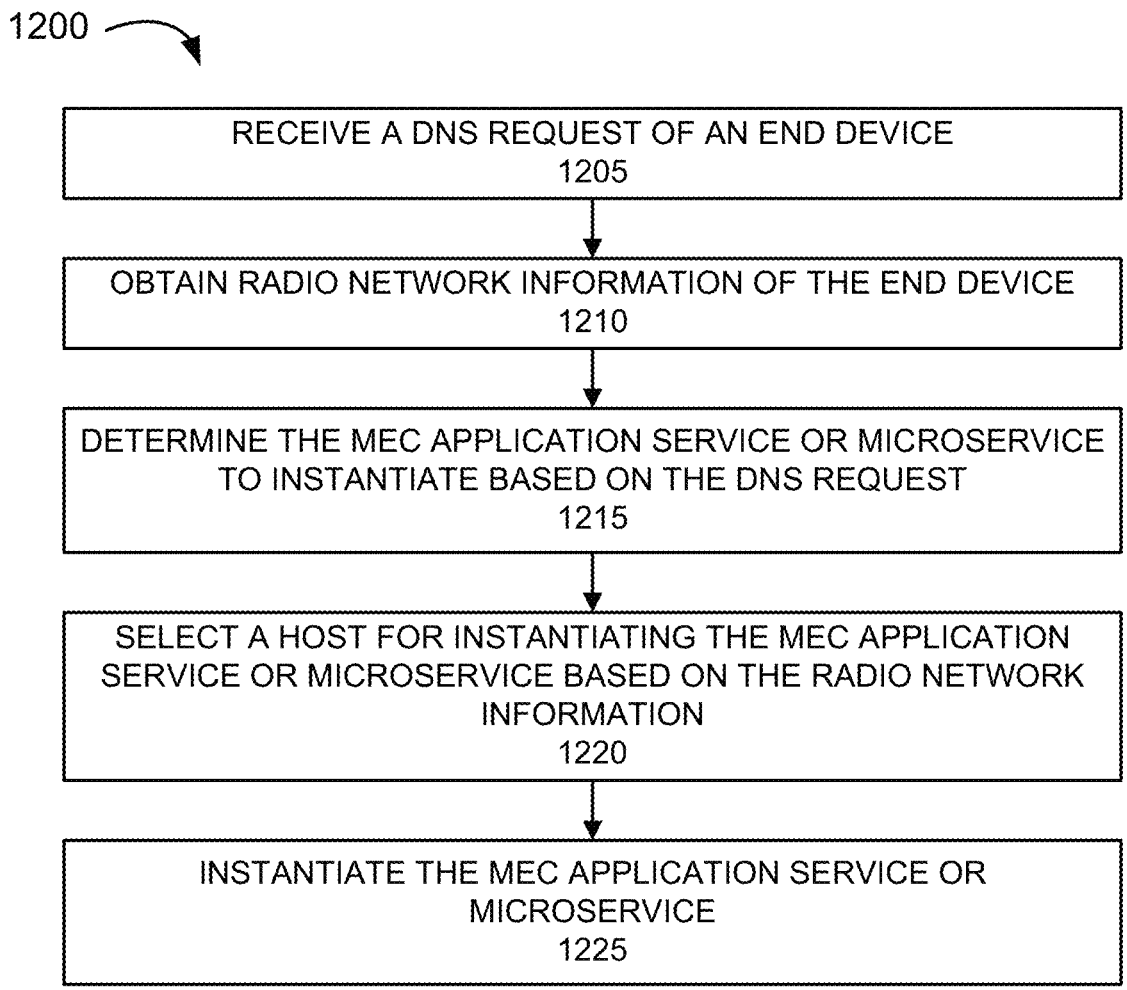
FIG. 12 is a flow diagram illustrating another exemplary process of an exemplary embodiment of the lifecycle management service.

FIG. 12 is a flow diagram illustrating another exemplary process 1200 of an exemplary embodiment of the lifecycle management service. According to an exemplary embodiment, MEC device 117 (e.g., an orchestrator 202 or another type of MEC device 117 that may provide similar functionality) may perform, in whole or in part, steps of process 1200. According to other exemplary embodiments, other types of similarly functioning network devices of an application service layer network may perform, in whole or in part, the steps of process 1200, as described herein. According to an exemplary implementation, processor 1010 executes software 1020 to perform a step illustrated in FIG. 12, and described herein. Alternatively, a step illustrated in FIG. 12 and described herein, may be performed by execution of only hardware. Process 1200 may be performed as an automated process and may include the instantiation of a MEC application service or microservice.

In block 1205, a DNS request may be received from an end device. For example, MEC device 117 of MEC network 115 may receive a DNS request from end device 180 via a MEC DNS.

In block 1210, radio network information of the end device may be obtained. For example, MEC device 117 may obtain radio network information of end device 180 based on an RNIS.

In block 1215, a MEC application service or microservice may be selected to instantiate based on the DNS request. For example, MEC device 117 may determine the MEC application service or microservice to be instantiated based on the DNS request.

In block 1220, a host for instantiating the MEC application service or microservice may be selected based on the radio network information. For example, MEC device 117 may select a host 210 to instantiate the MEC application service or microservice based on location information relating to end device 180.

In block 1225, the MEC application service or microservice may be instantiated. For example, MEC device 117 may instantiate the MEC application service or microservice at the selected host 210. As previously described, MEC device 117 may select a suitable controller 204, and invoke an instantiation procedure.

FIG. 12 illustrates an exemplary process 1200 of the lifecycle management service, however, according to other embodiments, process 1200 may include additional operations, fewer operations, and/or different operations than those illustrated in FIG. 12, and described herein. For example, MEC device 117 may use other information (e.g., load balancing information, performance information, and/or monitoring information) for performing one or more of the steps (e.g., determining whether to instantiate, selecting a host, etc.), as described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 11 and 12, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 1010, etc.), or a combination of hardware and software (e.g., software 1020).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 1010) of a device. A non-transitory storage medium includes one or more of the storage mediums described in relation to memory/storage 1015. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   storing, by a network device of an application service layer network, management information pertaining to a lifecycle for at least one of an application service or a microservice;
   identifying, by the network device, a triggering event;
   comparing, by the network device in response to the identifying, a number of requests from end devices for the at least one of the application service or the microservice to a threshold number of requests, wherein the management information includes the threshold number of requests that pertain to new requests received during a time window;
   determining, by the network device based on the comparing, whether the threshold number of requests is satisfied;
   terminating, by the network device in response to determining that the threshold number of requests is not satisfied, a virtual network device that provides the at least one of the application service or the microservice; and
   instantiating, by the network device before or after the terminating, the virtual network device that provides the at least one of the application service or the microservice based on radio network information pertaining to at least one of the end devices.

2. The method of claim 1, wherein the triggering event is receipt of one or more requests from the end devices, an absence of receipt of one or more requests from the end devices, or expiration of a periodic time window.

3. The method of claim 1, wherein the virtual network device includes one or multiple containers or one or multiple virtual machines.

4. The method of claim 1, wherein the management information further includes at least one of threshold load balancing information, threshold security information, threshold health information, or threshold performance information, and the method further comprising:
   obtaining, by the network device from one or more other network devices of the application service layer network, at least one of load balance information, security information, health information, or performance information pertaining to the virtual network device;
   comparing, by the network device, the management information to the at least one of load balance information, security information, health information, or performance information pertaining to the virtual network device; and
   determining, by the network device, whether the at least one of load balance information, security information, health information, or performance information pertaining to the virtual network device satisfies the management information.

5. The method of claim 1, further comprising:
   generating, by the network device, a request to terminate the virtual network device;
   transmitting, by the network device to an other network device, the request; and
   receiving, by the network device from the other network device, a response indicating to terminate the virtual network device.

6. The method of claim 5, wherein the application service layer network is a multi-access edge computing network, and the other network device includes an orchestrator.

7. The method of claim 1,
wherein the radio network information includes at least one of end device context information, radio network condition information, or radio access bearer information.

8. The method of claim 1, wherein the application service layer network is a multi-access edge computing network, and the network device includes an edge controller for one or multiple host devices that provide the at least one of the application service or the microservice.

9. A network device comprising:
a communication interface;
a memory, wherein the memory stores instructions; and
a processor, wherein the processor executes the instructions to:
  store management information pertaining to a lifecycle for at least one of an application service or a microservice, wherein the network device is included in an application service layer network;
  identify a triggering event;
  compare, in response to the identification, a number of requests from end devices for the at least one of the application service or the microservice to a threshold number of requests, wherein the management information includes the threshold number of requests that pertain to new requests received during a time window;
  determine, based on the comparison, whether the threshold number of requests is satisfied;
  terminate, in response to a determination that the threshold number of requests is not satisfied, a virtual network device that provides the at least one of the application service or the microservice; and
  instantiate, before or after the termination, the virtual network device that provides the at least one of the application service or the microservice based on radio network information pertaining to at least one of the end devices.

10. The network device of claim 9, wherein the triggering event is receipt of one or more requests from the end devices, an absence of receipt of one or more requests from the end devices, or expiration of a periodic time window.

11. The network device of claim 9, wherein the virtual network device includes one or multiple containers or one or multiple virtual machines.

12. The network device of claim 9, wherein the management information further includes at least one of threshold load balancing information, threshold security information, threshold health information, or threshold performance information, and wherein the processor further executes the instructions to:
  obtain, via the communication interface from one or more other network devices of the application service layer network, at least one of load balance information, security information, health information, or performance information pertaining to the virtual network device;
  compare the management information to the at least one of load balance information, security information, health information, or performance information pertaining to the virtual network device; and
  determine whether the at least one of load balance information, security information, health information, or performance information pertaining to the virtual network device satisfies the management information.

13. The network device of claim 9, wherein the processor further executes the instructions to:
  generate a request to terminate the virtual network device;
  transmit, via the communication interface to an other network device, the request; and
  receive, via the communication interface from the other network device, a response indicating to terminate the virtual network device.

14. The network device of claim 13, wherein the application service layer network is a multi-access edge computing network, and the other network device includes an orchestrator.

15. The network device of claim 9, wherein the
radio network information includes at least one of end device context information, radio network condition information, or radio access bearer information.

16. The network device of claim 9, wherein the application service layer network is a multi-access edge computing network, and the network device includes an edge controller for one or multiple host devices that provide the at least one of the application service or the microservice.

17. A non-transitory computer-readable storage medium storing instructions executable by a processor of a device, which when executed cause the device to:
  store management information pertaining to a lifecycle for at least one of an application service or a microservice, wherein the device is included in an application service layer network;
  identify a triggering event;
  compare, in response to the identification, a number of requests from end devices for the at least one of the application service or the microservice to a threshold number of requests, wherein the management information includes the threshold number of requests that pertain to new requests received during a time window;
  determine, based on the comparison, whether the threshold number of requests is satisfied;
  terminate, in response to a determination that the threshold number of requests is not satisfied, a virtual network device that provides the at least one of the application service or the microservice; and
  instantiate, before or after the termination, the virtual network device that provides the at least one of the application service or the microservice based on radio network information pertaining to at least one of the end devices.

18. The non-transitory computer-readable storage medium of claim 17, wherein the triggering event is receipt of one or more requests from the end devices, an absence of receipt of one or more requests from the end devices, or expiration of a periodic time window.

19. The non-transitory computer-readable storage medium of claim 17, wherein the management information further includes at least one of threshold load balancing information, threshold security information, threshold health information, or threshold performance information, and wherein the instructions further comprise instructions, which when executed cause the device to:
  obtain, from one or more network devices of the application service layer network, at least one of load balance information, security information, health information, or performance information pertaining to the virtual network device;
  compare the management information to the at least one of load balance information, security information, health information, or performance information pertaining to the virtual network device; and determine whether the at least one of load balance information, security information, health information, or performance information pertaining to the virtual network device satisfies the management information.

20. The non-transitory computer-readable storage medium of claim 17, wherein the application service layer network is a multi-access edge computing network, and the device includes an edge controller for one or multiple host devices that provide the at least one of the application service or the microservice.

* * * * *